(12) United States Patent
Otani et al.

(10) Patent No.: US 11,077,843 B2
(45) Date of Patent: Aug. 3, 2021

(54) SENSOR MODULE, MEASUREMENT SYSTEM, ELECTRONIC APPARATUS, AND VEHICLE

(71) Applicant: Seiko Epson Corporation, Tokyo (JP)

(72) Inventors: Fumikazu Otani, Matsumoto (JP); Yoshikuni Saito, Suwa (JP); Taketo Chino, Hokuto (JP); Nobuyuki Imai, Shiojiri (JP)

(73) Assignee: Seiko Epson Corporation

( * ) Notice: Subject to any disclaimer, the term of this patent is extended or adjusted under 35 U.S.C. 154(b) by 214 days.

(21) Appl. No.: 16/356,012

(22) Filed: Mar. 18, 2019

(65) Prior Publication Data

US 2019/0283732 A1 Sep. 19, 2019

(30) Foreign Application Priority Data

Mar. 19, 2018 (JP) .............................. JP2018-050848

(51) Int. Cl.
  *B60W 30/02* (2012.01)
  *G01C 9/06* (2006.01)
(52) U.S. Cl.
  CPC ............... *B60W 30/02* (2013.01); *G01C 9/06* (2013.01); *B60W 2520/18* (2013.01)
(58) Field of Classification Search
  CPC .. B60W 30/02; B60W 2520/18; B60W 40/10; G01C 9/06; G01C 21/16; G01C 19/5776; G01C 15/00; G01D 21/02
  See application file for complete search history.

(56) References Cited

U.S. PATENT DOCUMENTS

| 5,951,669 A * | 9/1999 | Bailey .................... G06F 13/24 710/23 |
| 2015/0160868 A1 | 6/2015 | Sudo et al. |
| 2016/0036544 A1* | 2/2016 | Katayama .............. G01D 18/00 702/89 |
| 2018/0274925 A1* | 9/2018 | Sudo ..................... G01P 15/097 |

FOREIGN PATENT DOCUMENTS

JP  2015-114810 A  6/2015

* cited by examiner

*Primary Examiner* — Anne Marie Antonucci
(74) *Attorney, Agent, or Firm* — Harness, Dickey & Pierce, P.L.C.

(57) ABSTRACT

A sensor module includes a first sensor device, a second sensor device, and a microcontroller. The first sensor device includes a first synchronization terminal to which an external synchronization signal or a synchronization signal which is a signal based on the external synchronization signal is input, a first interface outputs first measurement data to the microcontroller on the basis of the synchronization signal which is input to the first synchronization terminal, the second sensor device includes a second synchronization terminal to which the synchronization signal is input, and a second interface outputs second measurement data to the microcontroller on the basis of the synchronization signal which is input to the second synchronization terminal.

14 Claims, 20 Drawing Sheets

SENSOR MODULE, MEASUREMENT SYSTEM, ELECTRONIC APPARATUS, AND VEHICLE

The entire disclosure of Japanese Patent Application No. 2018-050848, filed Mar. 19, 2018 is expressly incorporated by reference herein.

BACKGROUND

1. Technical Field

The present invention relates to a sensor module, a measurement system, an electronic apparatus, and a vehicle.

2. Related Art

As a technique of making reading of measurement data in a host device efficient, there is the related art disclosed in JP-A-2015-114810. In this related art, in a case where common addresses with a plurality of measurement devices connected to a host device as common destinations are designated, and a read command is issued, an interface portion transmits measurement data to the host device in a data transmission order.

Meanwhile, in recent years, the demand for high accuracy of a sensor module used to measure information of a measurement target object has been increased. In order to measure information of a measurement target object on the basis of measurement data from a plurality of sensor devices mounted on a sensor module, the pieces of measurement data are required to be synchronized with each other, or the time at which the measurement data is acquired is required to be clarified.

However, in the related art, a timing at which measurement data is actually updated is not taken into consideration in a plurality of sensor devices. Thus, there is a problem in that it is not taken into consideration at which timing measurement data is to be transmitted to a microcontroller mounted on the sensor module.

SUMMARY

An aspect of the invention relates to a sensor module including a first sensor device that includes a first sensor element, a first measurement circuit which receives a signal from the first sensor element and performs a measurement process, and a first interface which outputs first measurement data from the first measurement circuit; a second sensor device that includes a second sensor element, a second measurement circuit which receives a signal from the second sensor element and performs a measurement process, and a second interface which outputs second measurement data from the second measurement circuit; and a microcontroller that receives the first measurement data from the first sensor device and the second measurement data from the second sensor device, in which the first sensor device further includes a first synchronization terminal to which an external synchronization signal or a synchronization signal which is a signal based on the external synchronization signal is input, in which the first interface outputs the first measurement data to the microcontroller on the basis of the synchronization signal which is input to the first synchronization terminal, in which the second sensor device further includes a second synchronization terminal to which the synchronization signal is input, and in which the second interface outputs the second measurement data to the microcontroller on the basis of the synchronization signal which is input to the second synchronization terminal.

In the aspect of the invention, the first interface may output the first measurement data which is fetched from the first measurement circuit at a synchronization timing of the synchronization signal, to the microcontroller, and the second interface may output the second measurement data which is fetched from the second measurement circuit at the synchronization timing of the synchronization signal, to the microcontroller.

In the aspect of the invention, the microcontroller may include a synchronization terminal to which the external synchronization signal is input.

In the aspect of the invention, the microcontroller may include an interruption controller, and the external synchronization signal may be input to the interruption controller.

In the aspect of the invention, the microcontroller may include a processing circuit, and the processing circuit may perform a process of issuing a command for acquiring the first measurement data from the first sensor device and the second measurement data from the second sensor device, with the external synchronization signal as an interruption cause.

In the aspect of the invention, the microcontroller may include a signal processing circuit that performs a digital signal process on the first measurement data from the first sensor device and the second measurement data from the second sensor device, and the signal processing circuit may perform the digital signal process every synchronization timing of the external synchronization signal.

In the aspect of the invention, in a case where the digital signal process is completed, the microcontroller may output a signal indicating completion of the digital signal process to the outside.

In the aspect of the invention, the microcontroller may further include a host interface, and the microcontroller may output the first measurement data and the second measurement data having undergone the digital signal process to the outside via the host interface.

In the aspect of the invention, the external synchronization signal may be a signal generated on the basis of a time reference signal.

In the aspect of the invention, the time reference signal may be a signal acquired from a satellite positioning system.

Another aspect of the invention relates to a measurement system including the sensor module; and a host device that is electrically connected to the sensor module.

Still another aspect of the invention relates to an electronic apparatus including the sensor module; and a processing section that performs a process on the basis of an output signal from the sensor module.

Still another aspect of the invention relates to an electronic apparatus including the sensor module; a case in which the sensor module is accommodated; a processing section that is accommodated in the case and performs a process on the basis of an output signal from the sensor module; a display section that is accommodated in the case; and a light transmissive cover that closes an opening of the case.

Still another aspect of the invention relates to a vehicle including the sensor module; and a control device that controls a posture of a vehicle on the basis of posture information of the vehicle obtained through a process based on an output signal from the sensor module.

Still another aspect of the invention relates to a vehicle including the sensor module; and a control device that controls at least one of acceleration, braking, and steering of a vehicle on the basis of position information and posture information of the vehicle obtained through a process based on an output signal from the sensor module, in which the control device switches between execution and non-execution of automatic driving of the vehicle on the basis of a monitoring result of the output signal from the sensor module.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
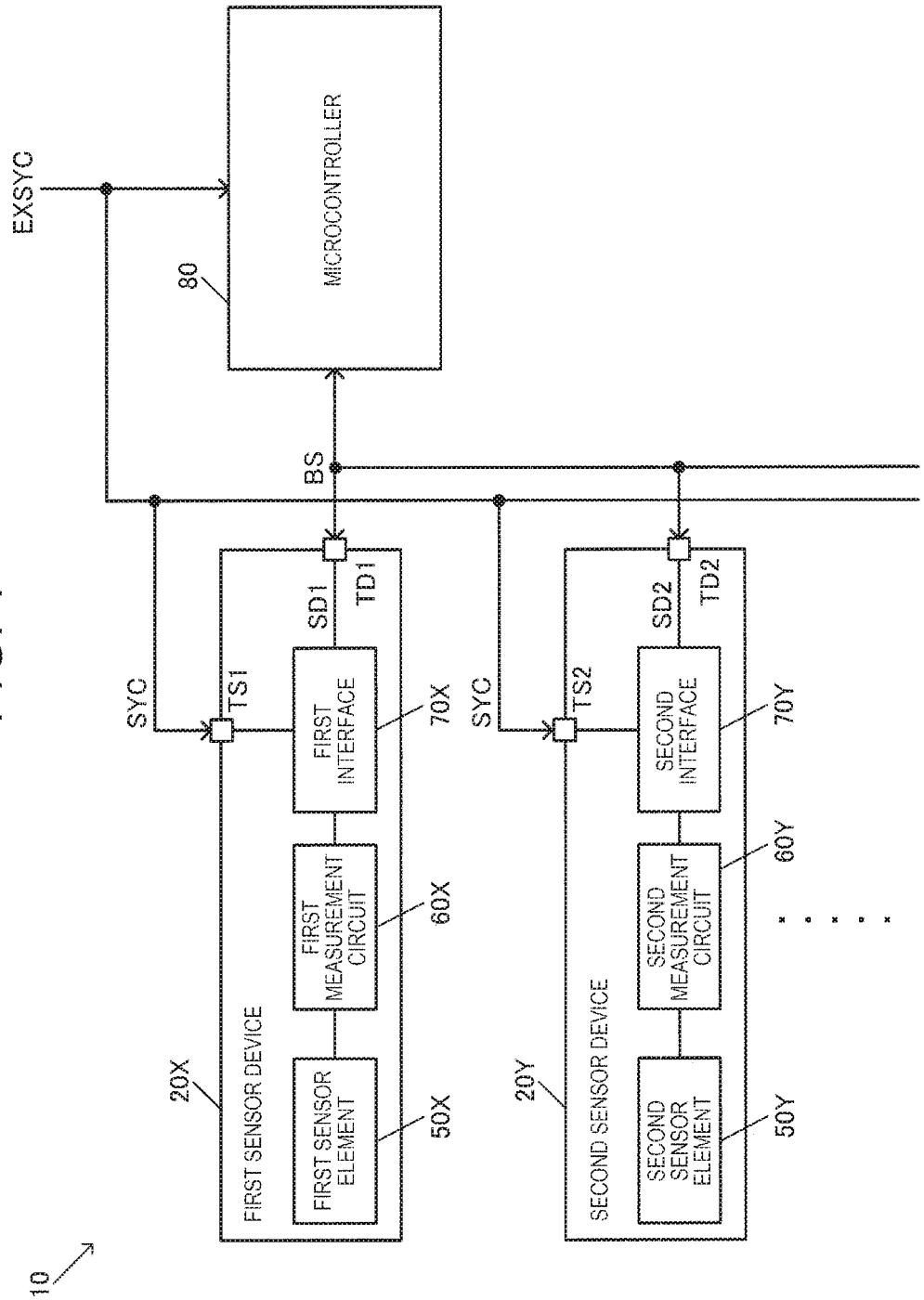
FIG. 1 is a diagram illustrating a configuration example of a sensor module of the present embodiment.

Hereinafter, a preferred embodiment of the invention will be described in detail. The embodiments described below do not improperly limit the content of the invention disclosed in the appended claims. All configurations described in the present embodiments are not essential to the invention.
1. Configuration Example of Sensor Module FIG. 1 illustrates a configuration example of a sensor module 10 of the present embodiment. The sensor module 10 is a physical quantity measurement module configured with a plurality of sensor devices, and a sensor system or a sensor unit is implemented by the sensor module 10. The sensor module 10 in FIG. 1 includes a first sensor device 20X, a second sensor device 20Y, and a microcontroller 80. A configuration of the sensor module 10 is not limited to the configuration illustrated in FIG. 1, and may be variously modified by omitting some constituent elements or adding other constituent elements. For example, FIG. 1 illustrates an exemplary case where the number of sensor devices is two, but the number of sensor devices may be three or more. For example, the sensor module 10 may include a first sensor device to an n-th sensor device (where n is an integer of 2 or greater).

The first sensor device 20X includes a first sensor element 50X, a first measurement circuit 60X which receives a signal from the first sensor element 50X and performs a measurement process, and a first interface 70X which outputs first measurement data SD1 from the first measurement circuit 60X. The first sensor device 20X is a device in which an integrated circuit device including the first sensor element 50X, the first measurement circuit 60X, and the first interface 70X is accommodated in a package. The integrated circuit device is an IC chip implemented by semiconductor. The second sensor device 20Y includes a second sensor element 50Y, a second measurement circuit 60Y which receives a signal from the second sensor element 50Y and performs a measurement process, and a second interface 70Y which outputs second measurement data SD2 from the second measurement circuit 60Y. The second sensor device 20Y is a device in which an integrated circuit device including the second sensor element 50Y, the second measurement circuit 60Y, and the second interface 70Y is accommodated in a package. In a case where the number of sensor device is three or more, and an n-th sensor device is provided, the n-th sensor device may include an n-th sensor element, an n-th measurement circuit which receives a signal from the n-th sensor element and performs a measurement process, and an n-th interface which outputs n-th measurement data from the n-th measurement circuit.

The first sensor element 50X and the second sensor element 50Y are sensor elements measuring a physical quantity, and may be said to be physical quantity transducers. The physical quantity is, for example, angular velocity, acceleration, angular acceleration, velocity, a distance, pressure, sound pressure, or a quantity of magnetism. The first sensor element 50X and the second sensor element 50Y measure different physical quantities. For example, in a case of angular velocity, the first sensor element 50X measures an angular velocity about a first axis, and the second sensor element 50Y measures an angular velocity about a second axis. For example, in a case of acceleration, the first sensor element 50X measures an acceleration in a direction of the first axis, and the second sensor element 50Y measures an acceleration in a direction of the second axis. Alternatively, the first sensor element 50X may measure a first physical quantity angular velocity, acceleration, angular acceleration, velocity, a distance, pressure, or a quantity of magnetism which is a physical quantity, and the second sensor element 50Y may measure a second physical quantity which is different from the first physical quantity. As an example, the first sensor element 50X measures angular velocity, and the second sensor element 50Y measures acceleration.

Each of the first measurement circuit 60X and the second measurement circuit 60Y may include an analog circuit and an A/D conversion circuit which converts an analog signal from the analog circuit into digital data. The analog circuit may include an amplification circuit which amplifies a signal from the sensor element, a detecting circuit such as a synchronous detecting circuit, a gain adjustment circuit, or an offset adjustment circuit. The A/D conversion circuit outputs digital measurement data to the interface. As A/D conversion types of the A/D conversion circuit, a successive comparison type, a delta sigma type, a flash type, a pipeline type, or a double integral type may be employed.

Each of the first interface 70X and the second interface 70Y is, for example, a circuit which performs a digital interface process, and performs, for example, transmission or reception of serial data. Specifically, each of the first interface 70X and the second interface 70Y performs an interface process based on a communication standard the SPI or the I2C. Alternatively, the interface may perform an interface process based on a communication standard obtained by developing the SPI or I2C, or an interface process based on a communication standard obtained by improving or altering a part of the SPI or I2C standard.

The microcontroller 80 receives the first measurement data SD1 from the first sensor device 20X and the second measurement data SD2 from the second sensor device 20Y. The sensor module 10 includes a digital interface bus BS which electrically connects the first sensor device 20X and the second sensor device 20Y to the microcontroller 80. The digital interface bus BS is a bus conforming to a communication standard for the interface processes performed by the first interface 70X and the second interface 70Y. The digital interface bus BS includes data signal lines and clock signal lines. A chip select signal line may be included. The microcontroller 80 receives the first measurement data SD1 from the first sensor device 20X and the second measurement data SD2 from the second sensor device 20Y via the digital interface bus BS. The first interface 70X and the second interface 70Y are electrically connected to the digital interface bus BS via terminals TD1 and TD2. Here, the "electrical connection" indicates connection causing an electric signal to be transmitted, and also connection causing information using an electric signal to be transmitted. The microcontroller 80 is a master controller of the first sensor device 20X and the second sensor device 20Y. The microcontroller 80 is an integrated circuit device, and may be implemented by a processor such as an MPU or a CPU. Alternatively, the microcontroller 80 may be implemented by an ASIC using automatic disposition wirings such as a gate array.

In the present embodiment, the first sensor device 20X has a first synchronization terminal TS1 to which the synchronization signal SYC is input. The first interface 70X outputs the first measurement data SD1 to the microcontroller 80 on the basis of the synchronization signal SYC input to the first synchronization terminal TS1. The second sensor device 20Y includes a second synchronization terminal TS2 to which the synchronization signal SYC is input. The second interface 70Y outputs the second measurement data SD2 to the microcontroller 80 on the basis of the synchronization signal SYC input to the second synchronization terminal TS2.

Figure 3:
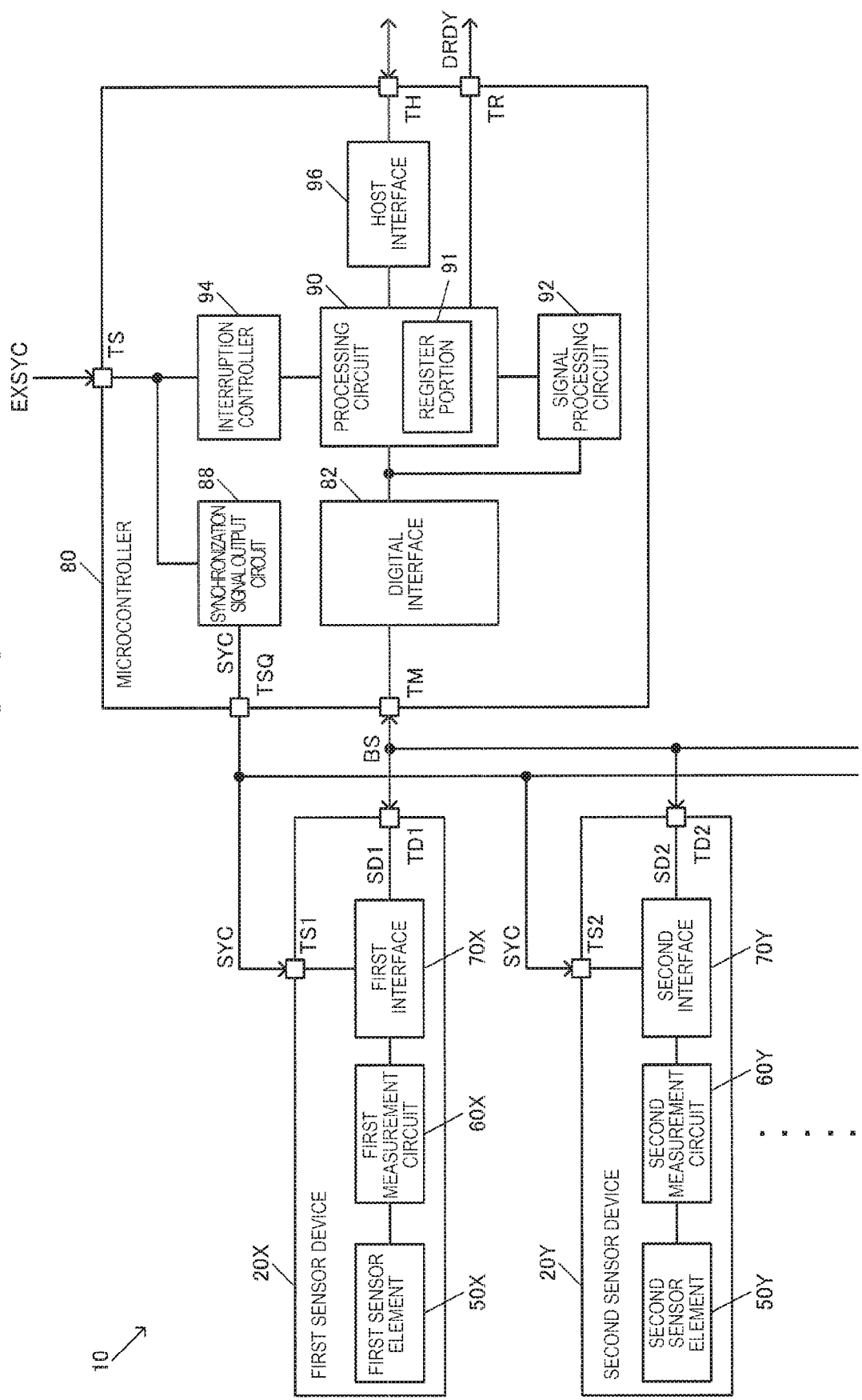
FIG. 3 is a diagram illustrating another configuration example of the microcontroller.

Here, the synchronization signal SYC is an external synchronization signal EXSYC or a signal based on the external synchronization signal EXSYC. The external synchronization signal EXSYC is a signal which is input to the sensor module 10 from an external device such as a host device 210 in FIG. 7 which will be described later, and is a signal which becomes active every synchronization timing. For example, the external synchronization signal EXSYC is a signal which becomes active every predetermined period. An active state is a state in a high level (H level) in a case of a positive logic, and is a state in a low level (L level) in a case of a negative logic. The synchronization signal SYC which is input to the first sensor device 20X and the second sensor device 20Y may be the external synchronization signal EXSYC, and may be a signal based on the external synchronization signal EXSYC. The signal based on the external synchronization signal EXSYC is a signal generated by using the external synchronization signal EXSYC. For example, as illustrated in FIG. 3 which will be described later, the signal based on the external synchronization signal EXSYC is a signal generated, for example, by another circuit such as the microcontroller 80 sampling the external synchronization signal EXSYC with a clock signal. The first synchronization terminal TS1 and the second synchronization terminal TS2 are, for example, terminals respectively provided in packages of the first sensor device 20X and the second sensor device 20Y, and are external connection terminals.

As mentioned above, in the sensor module 10 of the present embodiment, each sensor device has a dedicated synchronization terminal, for example, the first sensor device 20X has the first synchronization terminal TS1, and the second sensor device 20Y has the second synchronization terminal TS2. The first sensor device 20X outputs the first measurement data SD1 to the microcontroller 80 on the basis of the synchronization signal SYC which is input to the first synchronization terminal TS1, and the second sensor device 20Y outputs the second measurement data SD2 to the microcontroller 80 on the basis of the synchronization signal SYC which is input to the second synchronization terminal TS2. Therefore, each of the first sensor device 20X and the second sensor device 20Y can acquire measurement data at an appropriate timing by using the synchronization signal SYC which is input to the synchronization terminal, and can output the measurement data to the microcontroller 80. Consequently, it is possible to achieve high accuracy of information measured by using the sensor module 10.

For example, in order to appropriately measure information such as posture information of a measurement target object, movement distance information, or inertial information on the basis of measurement data from the first sensor device 20X and the second sensor device 20Y, it is desirable for pieces of measurement data to be synchronized with each other or for the time at which each piece of measurement data to be clear.

As regards this content, as a method of a first comparative example of the present embodiment, there may be a method in which each sensor device outputs measurement data acquired immediately before a measurement data output period, to the microcontroller 80. For example, it is assumed that the first sensor device 20X outputs the first measurement data SD1 in a first output period, and the second sensor device 20Y outputs the second measurement data SD2 in a second output period after the first output period. In this case, in the method of the first comparative example, the first sensor device 20X outputs the first measurement data SD1 acquired from the first measurement circuit 60X to the microcontroller 80 at a first timing immediately before the first output period. The second sensor device 20Y outputs the second measurement data SD2 acquired from the second measurement circuit 60Y to the microcontroller 80 at a second timing immediately before the second output period.

However, since the first timing and the second timing are timings which are temporally deviated relative to each other, an according to an acquisition timing for the first measurement data SD1 and an acquisition timing for the second measurement data SD2 are temporally deviated, and thus acquisition timings for measurement data are not synchronized with each other.

For example, in a case where the first sensor device 20X and the second sensor device 20Y are respectively an X-axis angular velocity sensor device and a Y-axis angular velocity sensor device, an acquisition timing for X-axis angular velocity data and an acquisition timing for Y-axis angular velocity data are temporally deviated relative to each other. Therefore, in a case where posture information of a measurement target object such as a vehicle is measured on the basis of such X-axis angular velocity data and Y-axis angular velocity data, accurate posture information cannot be measured.

As regards this fact, according to the present embodiment, the first sensor device 20X and the second sensor device 20Y can respectively output the first measurement data SD1 and the second measurement data SD2 acquired from the first measurement circuit 60X and the second measurement circuit 60Y, to the microcontroller 80 by using the common synchronization signal SYC. In other words, acquisition timings for the first measurement data SD1 and the second measurement data SD2 can be synchronized with each other. The angular velocity sensor devices can output, for example, X-axis angular velocity data and Y-axis angular velocity data which are acquired at a common synchronization timing, to the microcontroller 80. Therefore, in a case where posture information of a measurement target object is measured on the basis of the X-axis angular velocity data and the Y-axis angular velocity data, it is possible to measure posture information with higher accuracy.

As a method of a second comparative example of the present embodiment, there may be a method in which, in a case where the microcontroller 80 issues a command with a plurality of sensor devices as common destinations, measurement data from each measurement circuit is acquired at a common fetch timing specified by issuing the command, and is output to the microcontroller 80. For example, measurement data from each measurement circuit is acquired and is output to the microcontroller 80 at a timing at which an issued command is determined as being a command with a plurality of sensor devices as common destinations as a result of analysis of the command.

However, issuing of a command in the microcontroller 80 is not performed at each constant time, and there is a temporal fluctuation in an issue timing. Thus, a fluctuation occurs in an acquisition timing for measurement data, and information such as posture information of a measurement target object acquired by using the sensor module 10 is not accurate and not appropriate due to the fluctuation.

The microcontroller 80 performs not only a process of issuing a command to the sensor device but also various processes. Thus, in a case where there is an interruption request having high priority, the interruption process is preferentially performed, and thus the process of issuing a command to the sensor device is delayed. Therefore, due to other interruption requests, a temporal fluctuation occurs in a timing of issuing a command to the sensor device, and thus a temporal fluctuation occurs in an acquisition timing for measurement data.

As regards this fact, according to the present embodiment, measurement data can be acquired from the measurement circuit so as to be output to the microcontroller 80 by using the synchronization signal SYC regardless of a process performed by the microcontroller 80. For example, even in a case where the microcontroller 80 performs a process having a high interruption priority, measurement data can be acquired at a synchronization timing of the synchronization signal SYC regardless thereof. Therefore, it is possible to prevent the problem that a temporal fluctuation occurs at an acquisition timing for measurement data.

For example, in the present embodiment, the first interface 70X outputs the first measurement data SD1 fetched from the first measurement circuit 60X at a synchronization timing of the synchronization signal SYC, to the microcontroller 80. The second interface 70Y outputs the second measurement data SD2 fetched from the second measurement circuit 60Y at the synchronization timing of the synchronization signal SYC, to the microcontroller 80.

In the above-described way, the first interface 70X can hold the first measurement data SD1 fetched at the synchronization timing in a register or the like. In a case where the microcontroller 80 issues a read command for the measurement data, the held first measurement data SD1 may be output to the microcontroller 80. Therefore, the first measurement data SD1 can be acquired from the first measurement circuit 60X at the synchronization timing of the synchronization signal SYC without depending on a command issue timing of the microcontroller 80, and can be output to the microcontroller 80 when a command is issued. Similarly, the second interface 70Y can hold the second measurement data SD2 fetched at the synchronization timing in a register or the like. In a case where the microcontroller 80 issues a read command for the measurement data, the held second measurement data SD2 may be output to the microcontroller 80. Therefore, the second measurement data SD2 can be acquired from the second measurement circuit 60Y at the synchronization timing of the synchronization signal SYC without depending on a command issue timing of the microcontroller 80, and can be output to the microcontroller 80 when a command is issued. Therefore, it is possible to prevent the problem of a temporal fluctuation in an acquisition timing for measurement data, which is problematic in the method of the second comparative example.

Figure 2:
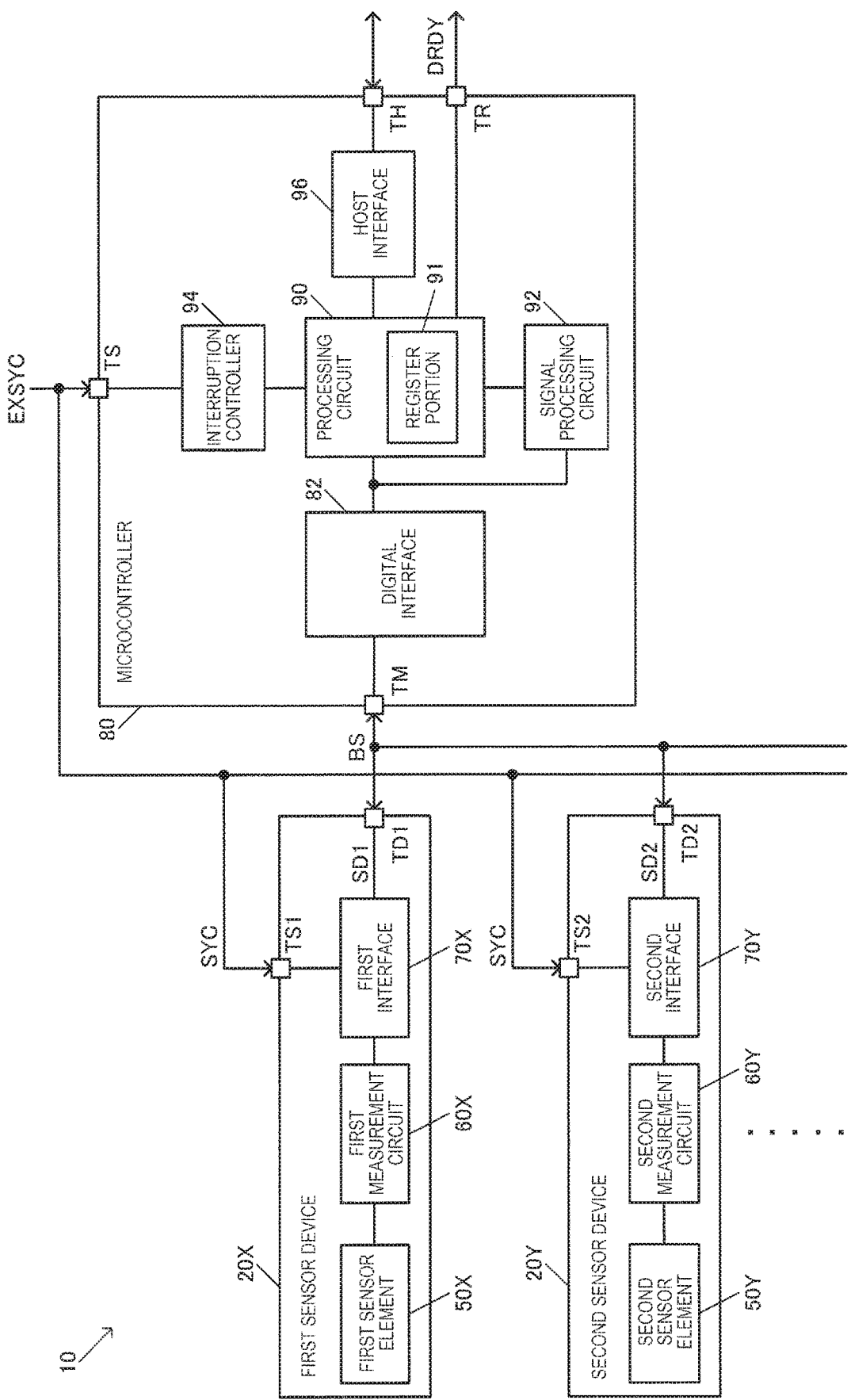
FIG. 2 is a diagram illustrating a configuration example of a microcontroller.

FIG. 2 is a diagram illustrating a configuration example of the microcontroller 80. The microcontroller 80 includes the digital interface 82, a processing circuit 90, a signal processing circuit 92, an interruption controller 94, and the host interface 96. The digital interface 82 is a circuit which performs an interface process with the sensor device. In other words, the digital interface 82 performs an interface process as a master of the first interface 70X and the second interface 70Y. The digital interface 82 is connected to the digital interface bus BS via a terminal TM. The digital interface 82 performs an interface process based on a communication standard the SPI or the I2C, or a communication standard obtained by developing the SPI or the I2C, or an interface process based on a communication standard obtained by improving or altering a part of the SPI or I2C standard, in the same manner as the first interface 70X and the second interface 70Y.

The processing circuit 90 is a circuit corresponding to a core CPU of the microcontroller 80, and performs various calculation processes or control processes. The processing circuit 90 includes a register portion 91 having various registers. The signal processing circuit 92 is a circuit which performs a digital signal process such as a filtering process or a correction process, and may be implemented by a DSP or the like. Specifically, the signal processing circuit 92 performs a process of computing a moving average of the latest J pieces of measurement data with respect to measurement data and then down-sampling the measurement data at a rate of 1/K (where J and K are integers of 2 or greater). The signal processing circuit 92 performs a correction process such as temperature correction on the measurement data having undergone a filtering process. The processing circuit 90 performs a process of storing the measurement data having undergone the correction process in the register portion 91. The processing circuit 90 generates a signal DRDY which is a measurement data preparation completion signal, and outputs the signal DRDY to the host device 210 in FIG. 7 which will be described later via a terminal TR. The signal DRDY is a signal indicating that a digital signal process in the signal processing circuit 92 is completed.

The register portion 91 has a plurality of registers which can be accessed from the outside. For example, the host device 210 may access a data register of the register portion 91 via the host interface 96, and read the measurement data. The processing circuit 90 performs a process of counting the number of the measurement data being updated in the data register. The counted update number is written into an update number register of the register portion 91. Consequently, the host device 210 can specify which number of data is read as the measurement data from the microcontroller 80.

The interruption controller 94 receives various interruption requests. Signals indicating an interruption request, an interruption level, and a vector number are output to the processing circuit 90 depending on a priority order and the interruption level. As one of interruption request signals, the external synchronization signal EXSYC is input to the interruption controller 94 via a synchronization terminal TS. In a case where an interruption request using the external synchronization signal EXSYC is received, the processing circuit 90 performs a corresponding interruption process. Examples of interruption requests include an interruption request using an SPI or UART of the host interface 96, interruption requests using various timers, and an interruption request using an I2C. The host interface 96 is a circuit which performs a digital interface process with the host device 210. For example, the host interface 96 performs serial data communication such as an SPI or UART as the host interface process.

FIG. 3 illustrates another configuration example of the microcontroller 80. In FIG. 3, a synchronization signal output circuit 88 is additionally provided in the microcontroller 80. The synchronization signal output circuit 88 receives the external synchronization signal EXSYC, and outputs the synchronization signal SYC which is generated on the basis of the external synchronization signal EXSYC. Specifically, the synchronization signal output circuit 88 samples the external synchronization signal EXSYC on the basis of an internal clock signal of the microcontroller 80, and outputs a resynchronized signal of the external synchronization signal EXSYC as the synchronization signal SYC. The synchronization signal SYC is output to the first sensor device 20X and the second sensor device 20Y via a terminal TSQ. In a case of FIGS. 1 and 2, the external synchronization signal EXSYC is input to the first sensor device 20X and the second sensor device 20Y as the synchronization signal SYC. In contrast, in FIG. 3, the synchronization signal SYC which is a resynchronized signal based on the external synchronization signal EXSYC is input to the first sensor device 20X and the second sensor device 20Y. In a case where the external synchronization signal EXSYC contains a lot of noise components, preferably, the external synchronization signal EXSYC is sampled with the internal clock signal, and is supplied to the first sensor device 20X and the second sensor device 20Y as the synchronization signal SYC.

Figure 4:
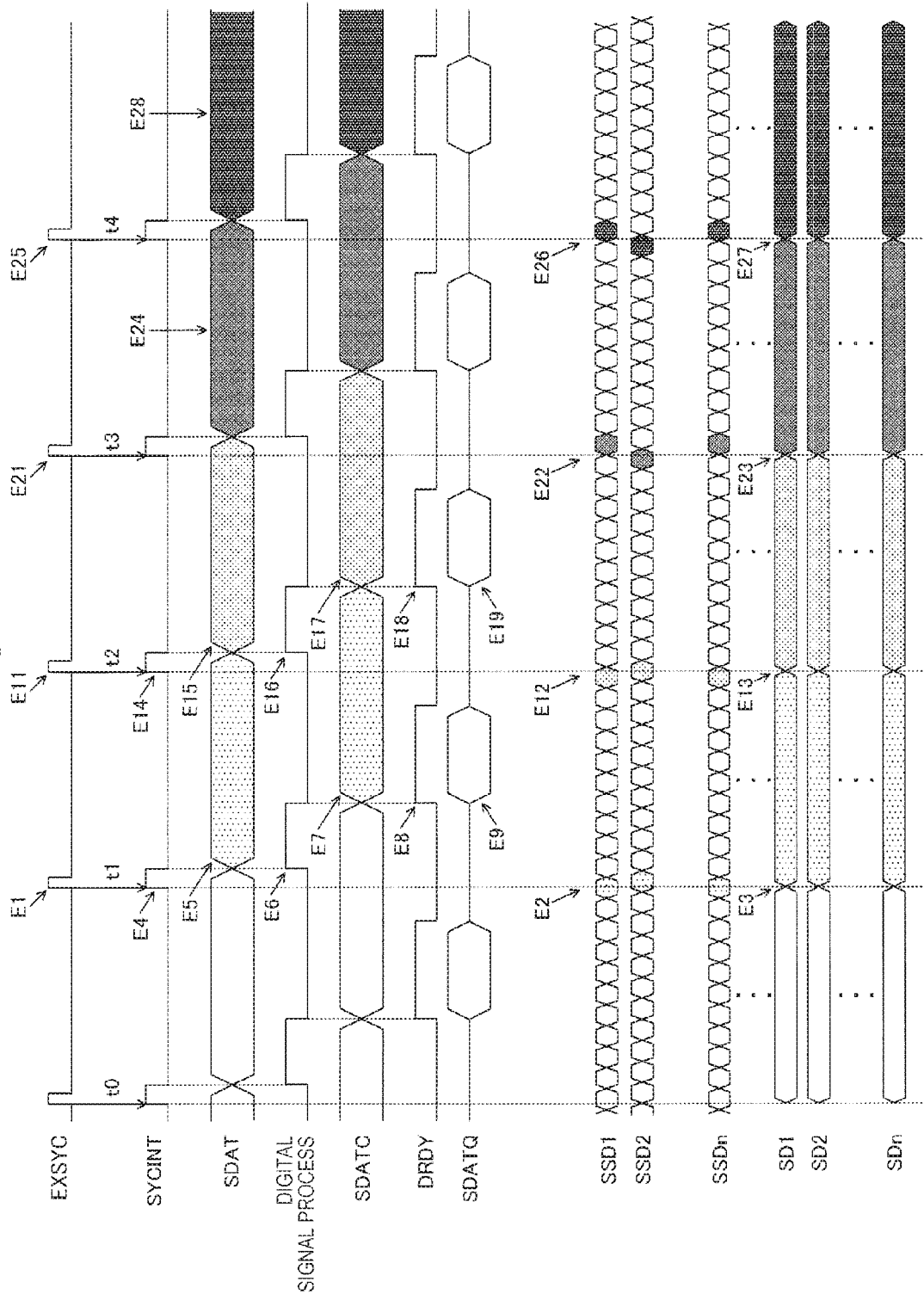
FIG. 4 is a signal waveform diagram illustrating an operation of the sensor module.

FIG. 4 is a signal waveform diagram for explaining an operation of the sensor module 10. As illustrated in FIG. 4, the external synchronization signal EXSYC becomes active every synchronization timing. In other words, the external synchronization signal EXSYC becomes active at a predetermined time interval. The external synchronization signal EXSYC is input to the first synchronization terminal TS1 and the second synchronization terminal TS2 of the first sensor device 20X and the second sensor device 20Y as the synchronization signal SYC. Then, at a synchronization timing t1 at which the synchronization signal SYC which is the external synchronization signal EXSYC becomes active (H level), as indicated by E2 in FIG. 4, first measurement data SSD1 from the first measurement circuit 60X and second measurement data SSD2 from the second measurement circuit 60Y are fetched. Specifically, the data is fetched to a register 67 in FIG. 5 which will be described later. FIG. 4 also illustrates n-th measurement data SSDn from an n-th measurement circuit.

In the present embodiment, the first sensor device 20X and the second sensor device 20Y operate on the basis of separate clock signals. For example, each sensor device operates on the basis of a clock signal from an oscillation circuit built into the sensor device or a clock signal generated by using a resonator such as a quartz crystal resonator of the sensor device. Thus, as indicated by E2 in FIG. 4, pieces of measurement data are output in an asynchronization manner from the measurement circuits of the respective sensor devices. In the present embodiment, the measurement data is latched and fetched with the synchronization signal SYC having an identical synchronization timing. As indicated by E3, the fetched measurement data is output to the microcontroller 80 from the first sensor device 20X and the second sensor device 20Y as the first measurement data SD1 and the second measurement data SD2. As will be described later, actually, the microcontroller 80 issues a read command, and the first measurement data SD1 and the second measurement data SD2 are output on the basis of the read command.

On the other hand, in the present embodiment, the external synchronization signal EXSYC is also input to the microcontroller 80 via the synchronization terminal TS. In a case where the external synchronization signal EXSYC becomes active at E1 in FIG. 4, the interruption controller 94 receives this state, and, as indicated by E4, an interruption process based on a signal SYCINT is started. The measurement data output at E3 is fetched to the microcontroller 80 via the digital interface 82 as measurement data SDAT as indicated by E5. Next, as indicated by E6, a digital signal process is started by the signal processing circuit 92. For example, a filtering process such as a moving average process is performed, and then a correction process such as temperature correction is performed such that measurement data SDATC having undergone the correction process is generated as indicated by E7. Then, the digital signal process is completed, and the signal DRDY indicating data preparation completion is output to the host device 210 via the terminal TR. The host device 210 accesses the register portion 91 via the host interface 96, and thus measurement data SDATQ is output to the host device 210 as indicated by E9.

Similarly, in a case where the external synchronization signal EXSYC becomes active at the next synchronization timing t2 as indicated by E11, measurement data from the measurement circuit of each sensor device is fetched as indicated by E12, and the measurement data is output from each sensor device as indicated by E13. As indicated by E14, E15, E16, and E17, the microcontroller 80 performs an interruption process or a digital signal process, and, as indicated by E18 and E19, the signal DRDY is output such that the measurement data SDATQ is output. In a case where the external synchronization signal EXSYC becomes active at the next synchronization timing t3 as indicated by E21, fetch and output of measurement data are performed in each sensor device as indicated by E22 and E23, and each process is performed in the microcontroller 80 as indicated by E24. The same processes are performed as indicated by E25, E26, E27, and E28 in FIG. 4.

As described above, in the present embodiment, as indicated by E2, E12, E22, and E26, each of a plurality of sensor devices incorporates measurement data from the measurement circuit at an identical synchronization timing based on the external synchronization signal EXSYC. Therefore, it is guaranteed that measurement data from a plurality of sensor device is measurement data acquired at an identical synchronization timing. It is guaranteed that, for example, in the three-axis angular velocity sensor devices, X-axis angular velocity data, Y-axis angular velocity data, and Z-axis angular velocity data are measurement data acquired at an identical synchronization timing.

Therefore, in a case where posture information of a measurement target object is obtained by using the X-axis angular velocity data, the Y-axis angular velocity data, and the Z-axis angular velocity data, it is possible to measure more appropriate and accurate posture information or the like.

Figure 5:
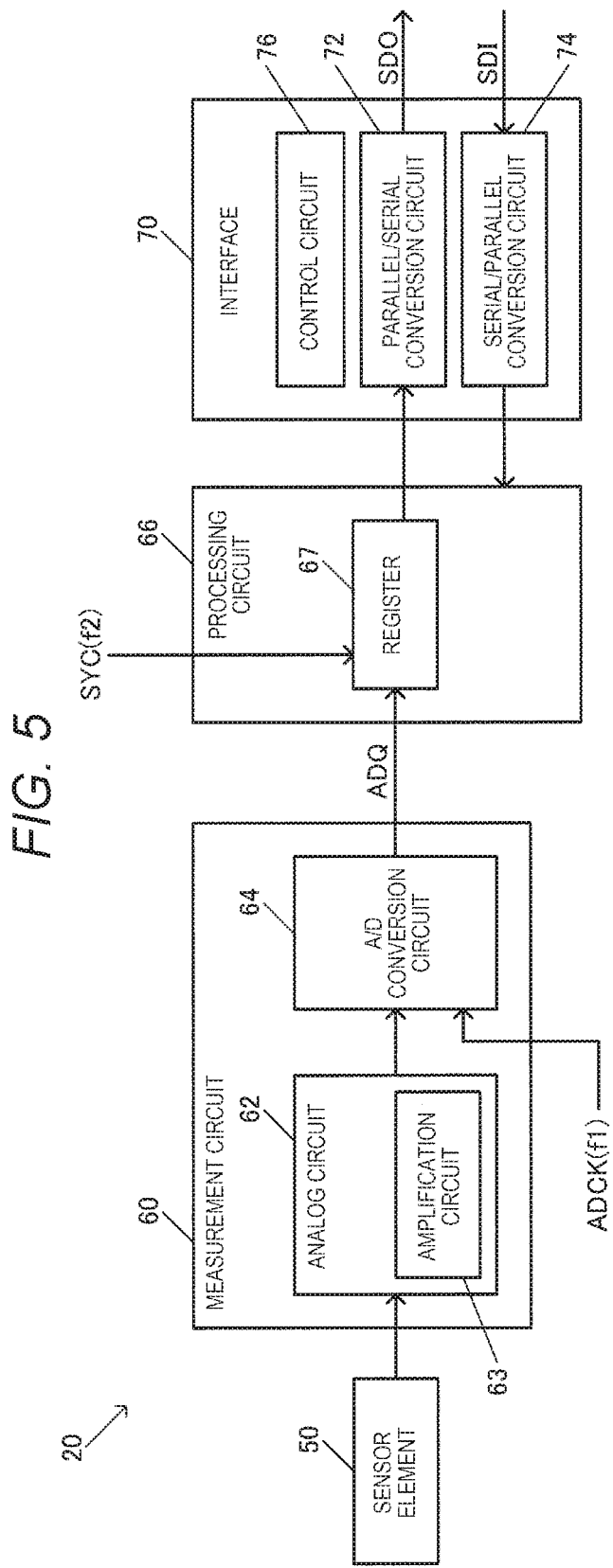
FIG. 5 is a diagram illustrating a configuration example of the sensor device.

FIG. 5 illustrates a configuration example of a sensor device 20. The sensor device 20 (20X or 20Y) includes the sensor element 50 (50X or 50Y), the measurement circuit 60 (60X or 60Y), a processing circuit 66, and the interface 70 (70X or 70Y). The measurement circuit 60 includes an analog circuit 62 having an amplification circuit 63 which amplifies a signal from the sensor element 50, and an A/D conversion circuit 64 which converts an analog signal from the analog circuit 62 into digital data. The processing circuit 66 includes the register 67. The interface 70 includes a parallel/serial conversion circuit 72, a serial/parallel conversion circuit 74, and a control circuit 76 which performs an interface control process. Configurations of the digital interface 82 (83 or 84) and the host interface 96 of the microcontroller 80 are the same as the configuration of the interface 70.

The A/D conversion circuit 64 samples an analog measurement signal from the analog circuit 62 so as to perform A/D conversion on the basis of a clock signal ADCK with a frequency f1. Measurement data ADQ is output at an output sampling rate corresponding to the frequency f1. Then, the register 67 incorporates the measurement data ADQ from the A/D conversion circuit 64 thereinto on the basis of the synchronization signal SYC with a frequency f2. Specifically, as indicated by E2, E12, E22, and E26 in FIG. 4, the register latches and holds the measurement data ADQ at a synchronization timing of the synchronization signal SYC. In a case where a resolution in A/D conversion of the A/D conversion circuit 64 is k bits, the measurement data ADQ is, for example, k-bit parallel data. The measurement data ADQ held in the register 67 is converted into serial data by the parallel/serial conversion circuit 72 of the interface 70, and the serial data is output to the microcontroller 80 as the data output signal SDO. Serial data of the data input signal SDI from the microcontroller 80 is converted into parallel data by the serial/parallel conversion circuit 74.

Here, the frequency f2 of the synchronization signal SYC is equal to or less than, for example, 1 KHz, and is about 100 Hz, for example, and is thus sufficiently lower than the frequency f1 of the clock signal ADCK of the A/D conversion circuit 64. Therefore, among pieces of measurement data which are sequentially output in a time series from the A/D conversion circuit 64 at the output sampling rate of the frequency f1, measurement data at an appropriate synchronization timing based on the synchronization signal SYC can be latched and held in the register 67. Consequently, even in a case where a temporal fluctuation occurs in a command issue timing of the microcontroller 80 due to other interruption processes, measurement data latched in the register 67 at an appropriate synchronization timing can be output as the data output signal SDO when a command is issued.

Figure 6:
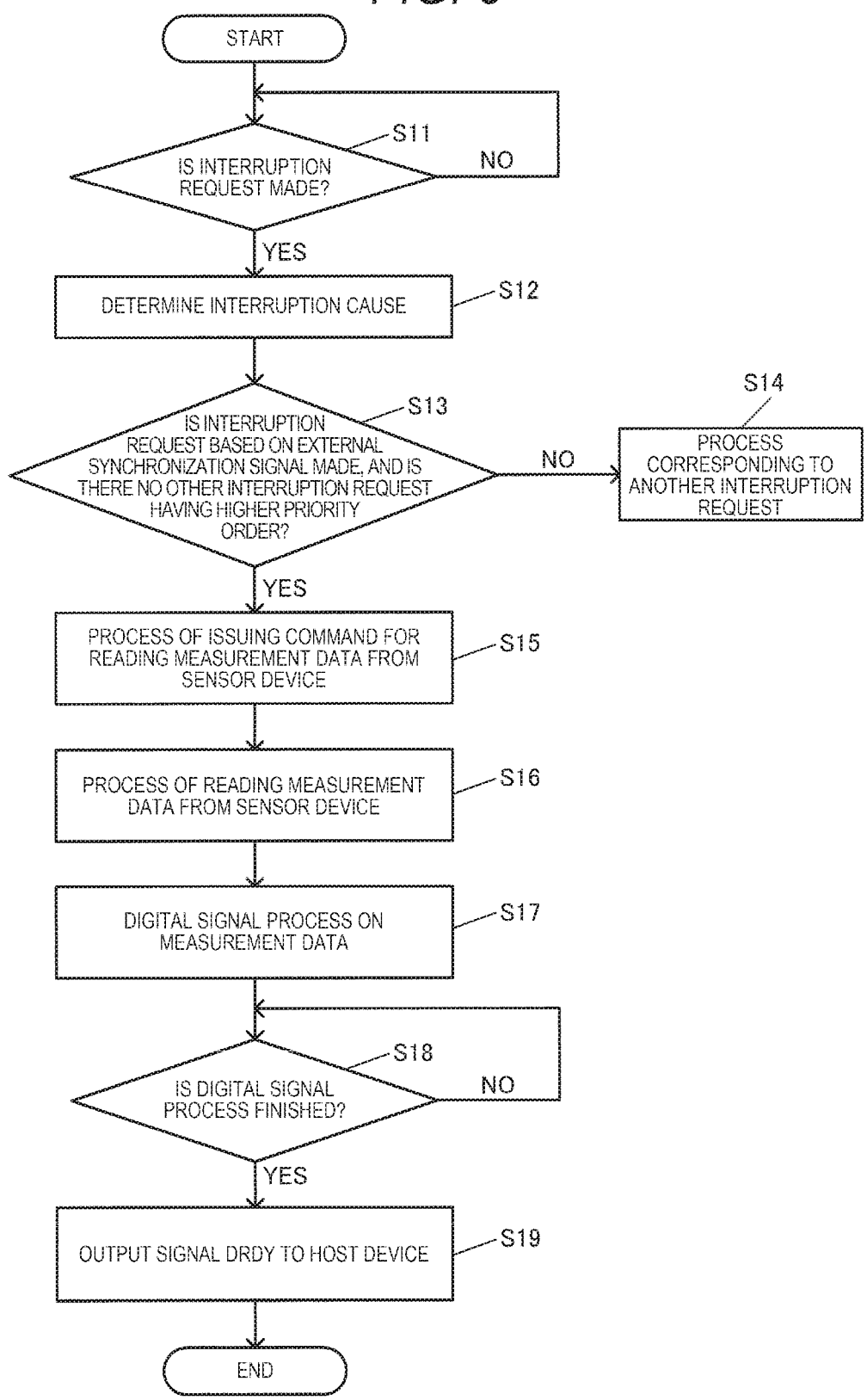
FIG. 6 is a flowchart illustrating an operation of the microcontroller.

FIG. 6 is a flowchart illustrating an operation of the microcontroller 80. The microcontroller 80 determines whether or not an interruption request is made (step S11). Specifically, it is determined whether or not an interruption request signal is input to the interruption controller 94. In a case where the interruption request is made, an interruption cause thereof is determined (step S12). In a case where an interruption request based on the external synchronization signal EXSYC is made, and there is no other interruption request having a higher priority order, a process of issuing a command for reading measurement data from the sensor device 20 is performed as an interruption process based on the external synchronization signal EXSYC (steps S13 and S15). On the other hand, in a case where there is another interruption request having a higher priority order, a process corresponding to another interruption request is performed (step S14). An interruption request having a higher priority order includes, for example, an interruption request based on an SPI or a UART of the host interface 96. For example, the interruption request is an interruption request for the host device 210 accessing the register portion 91. In a case where there is an interruption request having a higher priority order, execution of the interruption process based on the external synchronization signal EXSYC is delayed. The process corresponding to the interruption request having a higher priority order is finished, and then the interruption process based on the external synchronization signal EXSYC is performed. A temporal fluctuation occurs in a timing of issuing a measurement data read command due to the delay time.

The microcontroller 80 issues the read command, and then performs a process of reading measurement data from the sensor device 20 (step S16). Consequently, as indicated by E3 in FIG. 4, the measurement data from the sensor device 20 is read. The read measurement data is data fetched to the register 67 from the measurement circuit 60 at a synchronization timing of the synchronization signal SYC as indicated by E2. Therefore, even in a case where a temporal fluctuation occurs in the read command issue timing in step S15, a temporal fluctuation does not occur in an acquisition timing for measurement data from the sensor device 20.

Next, the microcontroller 80 performs a digital signal process on the measurement data read from the sensor device 20 (step S17). Specifically, a filtering process or a temperature correction process is performed. It is determined whether or not the digital signal process is finished (step S18), and, in a case where the digital signal process is finished, the signal DRDY indicating completion of preparation of the measurement data having undergone the digital signal process is output to the host device 210 (step S19).

As mentioned above, in the present embodiment, as illustrated in FIGS. 2 and 3, the microcontroller 80 includes the synchronization terminal TS to which the external synchronization signal EXSYC is input. Since the synchronization terminal TS is provided as mentioned above, the external synchronization signal EXSYC which is the synchronization signal SYC can be input not only to the sensor device 20 but also to the microcontroller 80. Consequently, the microcontroller 80 can perform a process of issuing a command to the sensor device 20 or perform a process of reading measurement data from the sensor device 20 by using the external synchronization signal EXSYC as a trigger.

In the present embodiment, the microcontroller 80 includes the interruption controller 94, and the external synchronization signal EXSYC is input to the interruption controller 94. In the above-described way, the microcontroller 80 can perform an interruption process corresponding to the external synchronization signal EXSYC with the external synchronization signal EXSYC as an interruption cause. In other words, it is possible to perform a process of issuing a command to the sensor device 20 or perform a process of reading measurement data from the sensor device 20 by using the external synchronization signal EXSYC as an interruption request signal.

The microcontroller 80 includes the processing circuit 90, and the processing circuit 90 performs a command issuing process for acquiring the first measurement data SD1 from the first sensor device 20X and the second measurement data SD2 from the second sensor device 20Y with the external synchronization signal EXSYC as an interruption cause. In other words, the processing circuit 90 performs a process of issuing a command for reading the first measurement data SD1 and the second measurement data SD2. In the above-described way, the processing circuit 90 determines whether or not there is another interruption request having a higher priority order, and performs a command issuing process which is an interruption process based on the external synchronization signal EXSYC in a case where such an interruption request is not present. On the other hand, in a case where there is an interruption request having a higher priority order, a process corresponding to the interruption request may be performed, and then a process of issuing a command for reading the first measurement data SD1 and the second measurement data SD2 may be performed. Since an interruption request having a higher priority order is performed as mentioned above, even in a case where a temporal fluctuation occurs in a command issue timing, measurement data is fetched at a synchronization timing, and thus a problem caused by the temporal fluctuation does not occur.

In the present embodiment, the microcontroller 80 includes the signal processing circuit 92 which performs a digital signal process on the first measurement data SD1 from the first sensor device 20X and the second measurement data SD2 from the second sensor device 20Y. The signal processing circuit 92 performs a digital signal process every synchronization timing of the external synchronization signal EXSYC. For example, a digital signal process such as a filtering process or a correction process is performed. For example, in a case where the external synchronization signal EXSYC becomes active as indicated by E1 in FIG. 4, the signal processing circuit 92 performs a digital signal process as indicated by E6. Next, in a case where the external synchronization signal EXSYC becomes active as indicated by E11, the signal processing circuit 92 performs a digital signal process as indicated by E16. In other words, the signal processing circuit 92 performs a digital signal process every synchronization timing of the external synchronization signal EXSYC as indicated by E1 and E11. In the above-described way, the signal processing circuit 92 can perform a digital signal process on measurement data acquired from the measurement circuit 60 at the synchronization timing of E1, at the timing of E6 corresponding to the synchronization timing of E1. Similarly, the signal processing circuit 92 can perform a digital signal process on measurement data acquired from the measurement circuit 60 at the synchronization timing of E11, at the timing of E16 corresponding to the synchronization timing of E11. Therefore, a digital signal process can be performed on measurement data acquired at an appropriate synchronization timing, at a timing corresponding to the synchronization timing.

In a case where a digital signal process is completed, the microcontroller 80 outputs the signal DRDY indicating completion of the digital signal process to the outside. For example, at the synchronization timing of E1 in FIG. 4, a digital signal process is performed, and the digital signal process is completed, as indicated by E6, and, in a case where measurement data SDATC having undergone the digital signal process is generated as indicated by E7, the signal DRDY is output to the outside as indicated by E8. Similarly, at the synchronization timing of E11, a digital signal process is performed, and the digital signal process is completed, as indicated by E16, and, in a case where measurement data SDATC having undergone the digital signal process is generated as indicated by E17, the signal DRDY is output to the outside as indicated by E18. In the above-described way, in a case where a digital signal process is performed, and the digital signal process is completed, in each synchronization period defined by the synchronization timings of E1 and E11, it is possible to notify the external host device 210 of the completion by using the signal DRDY.

In the present embodiment, the microcontroller 80 includes the host interface 96, and outputs the first measurement data and the second measurement data having undergone a digital signal process to the outside via the host interface 96. For example, in the synchronization period based on the synchronization timing of E1, in a case where measurement data SDATC having undergone the digital signal process is generated as indicated by E7, the measurement data is output to the host device 210 via the host interface 96 as measurement data SDATQ as indicated by E9. In the synchronization period based on the synchronization timing of E11, in a case where measurement data SDATC having undergone the digital signal process is generated as indicated by E17, the measurement data is output to the host device 210 via the host interface 96 as measurement data SDATQ as indicated by E19. The measurement data SDATQ is measurement data generated by performing digital signal processes on the first measurement data SD1 from the first sensor device 20X and the second measurement data SD2 from the second sensor device 20Y. In the above-described way, in a case where a digital signal process is completed in each synchronization period, and measurement data having undergone the digital signal process can be acquired, the measurement data can be output to the host device 210 via the host interface 96.

Figure 7:
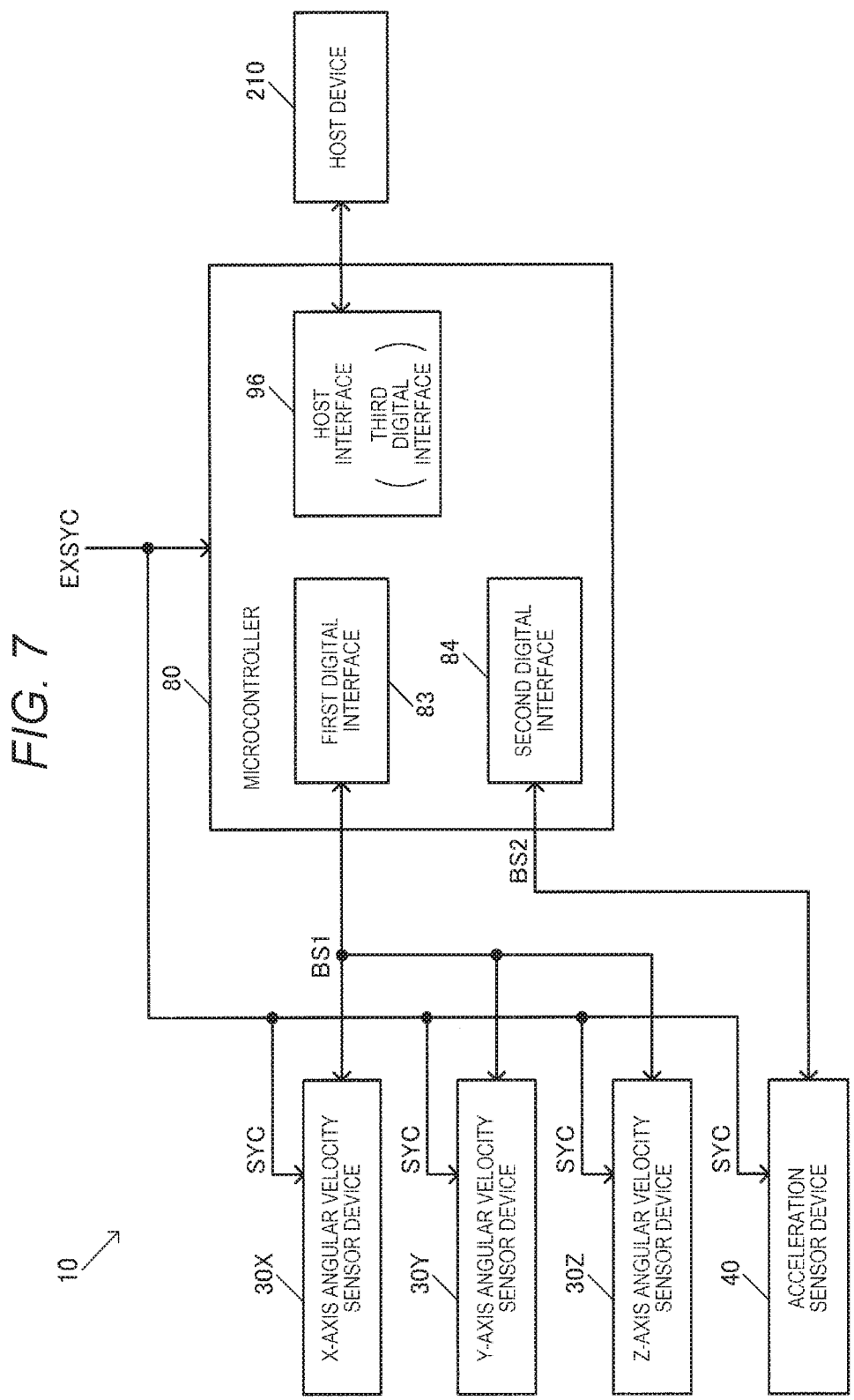
FIG. 7 is a diagram illustrating a configuration example of the sensor module measuring angular velocity and acceleration.

FIG. 7 illustrates a specific configuration example of the sensor module 10 in a case where the sensor device 20 is an angular velocity sensor device and an acceleration sensor device. The sensor module 10 in FIG. 7 includes an X-axis angular velocity sensor device 30X, a Y-axis angular velocity sensor device 30Y, a Z-axis angular velocity sensor device 30Z, an acceleration sensor device 40, the microcontroller 80, a first digital interface bus BS1, and a second digital interface bus BS2. A six-axis inertial measurement unit (IMU) may be implemented by the sensor module 10 having the configuration illustrated in FIG. 7. It is possible to detect an attitude or a behavior which is moment of inertia of a motion object such as an automobile or a robot as a vehicle by using the inertial measurement unit.

The X-axis angular velocity sensor device 30X measures an angular velocity about an X axis, and outputs digital X-axis angular velocity data. The X-axis angular velocity data is digital data indicating an angular velocity about the X axis. The X-axis angular velocity sensor device 30X includes a sensor element measuring an angular velocity about the X axis. The sensor element is, for example, a gyro sensor element configured with a piezoelectric vibrator such as a quartz crystal resonator. However, the sensor element is not limited thereto, and may be a Si-MEMS gyro sensor element of an electrostatic capacitance measurement type, formed from a silicon substrate. For example, the sensor element may be obtained by multiply connecting a plurality of Si-MEMS gyro sensor elements to each other. The X-axis angular velocity sensor device 30X includes an analog circuit having an amplification circuit which amplifies a measurement signal from the sensor element or a synchronous detecting circuit which performs synchronous detection on the measurement signal. The X-axis angular velocity sensor device 30X includes an A/D conversion circuit which converts an analog signal from the analog circuit into digital data. Output data from the A/D conversion circuit, or data obtained by performing a correction process such as temperature correction, offset correction, or sensitivity correction on the output data is X-axis angular velocity data.

The Y-axis angular velocity sensor device 30Y measures an angular velocity about a Y axis, and outputs digital Y-axis angular velocity data. The Y-axis angular velocity data is digital data indicating an angular velocity about the Y axis. The Y-axis angular velocity sensor device 30Y includes a sensor element measuring an angular velocity about the Y axis. As the sensor element, various types of sensor elements may be used as described above. The Y-axis angular velocity sensor device 30Y includes an analog circuit having an amplification circuit which amplifies a measurement signal from the sensor element or a synchronous detecting circuit, and an A/D conversion circuit which converts an analog signal from the analog circuit into digital data. Output data from the A/D conversion circuit, or data obtained by performing a correction process on the output data is Y-axis angular velocity data.

The Z-axis angular velocity sensor device 30Z measures an angular velocity about a Z axis, and outputs digital Z-axis angular velocity data. The Z-axis angular velocity data is digital data indicating an angular velocity about the Z axis. The Z-axis angular velocity sensor device 30Z includes a sensor element measuring an angular velocity about the Z axis. As the sensor element, various types of sensor elements may be used as described above. The Z-axis angular velocity sensor device 30Z includes an analog circuit having an amplification circuit which amplifies a measurement signal from the sensor element or a synchronous detecting circuit, and an A/D conversion circuit which converts an analog signal from the analog circuit into digital data. Output data from the A/D conversion circuit, or data obtained by performing a correction process on the output data is Z-axis angular velocity data.

The acceleration sensor device 40 measures an acceleration in the X axis direction, an acceleration in the Y axis direction, and an acceleration in the Z axis direction, and outputs digital X-axis acceleration data, Y-axis acceleration data, and Z-axis acceleration data. The X-axis acceleration data is digital data indicating an acceleration in the X axis direction. Similarly, the Y-axis acceleration data and the Z-axis acceleration data are digital data respectively indicating an acceleration in the Y axis direction and an acceleration in the Z axis direction. The acceleration sensor device 40 is, for example, a Si-MEMS sensor device of the electrostatic capacitance type which can measure accelerations in the X axis direction, the Y axis direction, and the Z axis direction with a single device. However, the present embodiment is not limited thereto, and the acceleration sensor device 40 may be a frequency change type quartz crystal acceleration sensor, a piezoelectric resistance type acceleration sensor, or a heat sensing type acceleration sensor.

The acceleration sensor device 40 includes a sensor element for measuring an X-axis acceleration, a sensor element for measuring a Y-axis acceleration, and a sensor element for measuring a Z-axis acceleration. As a sensor element for measuring each axis acceleration, a plurality of sensor elements may be provided. The acceleration sensor device 40 includes an analog circuit having an amplification circuit which amplifies a measurement signal from the sensor element for measuring each axis acceleration, and an A/D conversion circuit which converts an analog signal from the analog circuit into digital data. The A/D conversion circuit converts, for example, an analog signal of the X-axis acceleration, an analog signal of the Y-axis acceleration, and an analog signal of the Z-axis acceleration, into digital data in a time division manner. Output data from the A/D conversion circuit, or data obtained by performing a correction process such as temperature correction on the output data is X-axis acceleration data, Y-axis acceleration data, and Z-axis acceleration data.

The X axis, the Y axis, and the Z axis here are an X axis, a Y axis, and a Z axis as measurement axes of the sensor module 10. The Z axis is, for example, an axis in a direction orthogonal to an attachment surface of a measurement target object to which the sensor module 10 is attached. The attachment surface may be amounting surface on which the sensor module 10 is mounted. A thickness direction of the sensor module 10 in FIG. 14 which will be described later may be a direction of the Z axis. The X axis and the Y axis are orthogonal to each other, and are axes orthogonal to the Z axis. Directions of the X axis and the Y axis may be any directions, but, in FIG. 14, an axis parallel to a first side of a square shape of the sensor module 10 in a plan view may be set as the X axis, and an axis parallel to a second side of the square shape orthogonal to the first side may be set as the Y axis.

The microcontroller 80 includes a first digital interface 83 and a second digital interface 84. The first digital interface 83 and the second digital interface 84 are circuits performing a digital interface process, and perform, for example, transmission or reception of serial data. The first digital interface 83 and the second digital interface perform an interface process based on an SPI or I2C communication standard. Alternatively, an interface process based on a communication standard obtained by developing the SPI or the I2C, or an interface process based on a communication standard obtained by improving or altering a part of the SPI or I2C standard.

The first digital interface bus BS1 is a bus which electrically connects the X-axis angular velocity sensor device 30X, the Y-axis angular velocity sensor device 30Y, and the Z-axis angular velocity sensor device 30Z to the first digital interface 83 of the microcontroller 80. The X-axis angular velocity data from the X-axis angular velocity sensor device 30X, the Y-axis angular velocity data from the Y-axis angular velocity sensor device 30Y, and the Z-axis angular velocity data from the Z-axis angular velocity sensor device 30Z are input to the microcontroller 80 via the first digital interface bus BS1. The second digital interface bus BS2 is a bus which electrically connects the acceleration sensor device 40 to the second digital interface 84 of the microcontroller 80. The X-axis acceleration data, the Y-axis acceleration data, and the Z-axis acceleration data from the acceleration sensor device 40 are input to the microcontroller 80 via the second digital interface bus BS2. The first digital interface bus BS1 is a bus conforming to the communication standard for the interface process performed by the first digital interface 83. The second digital interface bus BS2 is a bus conforming to the communication standard for the interface process performed by the second digital interface 84. Each of the first digital interface bus BS1 and the second digital interface bus BS2 includes data signal lines and clock signal lines. A chip select signal line may be included. The first digital interface bus BS1 and the second digital interface bus BS2 are wired on a circuit substrate 100 of the sensor module 10 illustrated in FIG. 14.

The microcontroller 80 includes the host interface 96 which is a third digital interface connected to the host device 210. The host interface 96 is a circuit performing a digital interface process, and performs, for example, transmission or reception of serial data. The host interface 96 may be implemented by using, for example, an SPI or a UART.

Also in the configuration illustrated in FIG. 7, the external synchronization signal EXSYC as the synchronization signal SYC is input to the X-axis angular velocity sensor device 30X, the Y-axis angular velocity sensor device 30Y, the Z-axis angular velocity sensor device 30Z, and the acceleration sensor device 40. In other words, each sensor device is provided with a synchronization terminal as described in FIG. 1, and the external synchronization signal EXSYC is input as the synchronization signal SYC via the synchronization terminal. As mentioned above, in FIG. 7, a signal line for the synchronization signal SYC is provided in addition to the first digital interface bus BS1 and the second digital interface bus BS2. Specifically, a signal line for the synchronization signal SYC is wired on a circuit substrate 100 of the sensor module 10 in FIG. 14.

Figure 8:
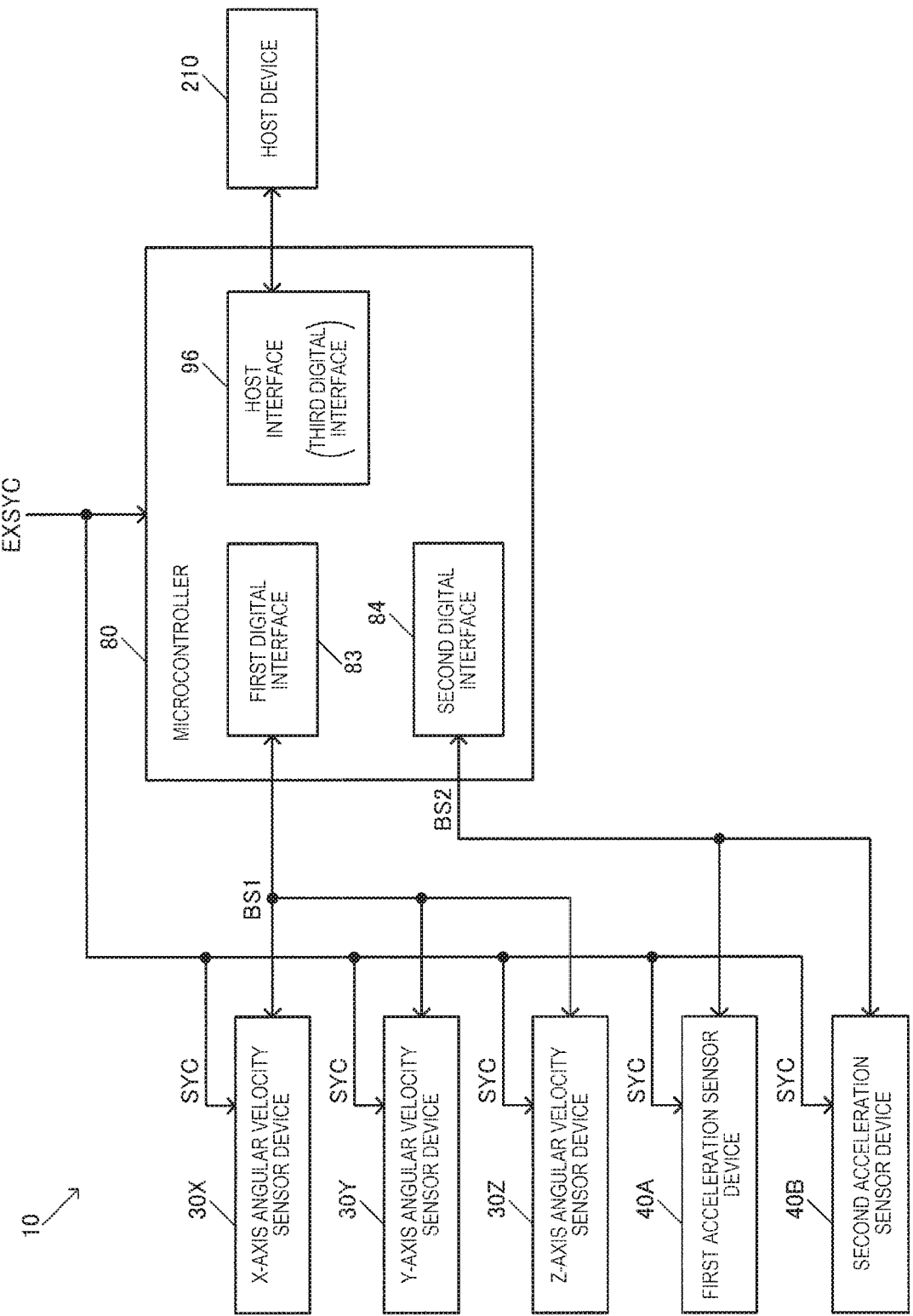
FIG. 8 is a diagram illustrating a configuration example of the sensor module measuring angular velocity and acceleration.

FIG. 8 illustrates another configuration example of the sensor module 10. The sensor module 10 in FIG. 8 further includes a second acceleration sensor device 40B in addition to a first acceleration sensor device 40A which is the acceleration sensor device 40 in FIG. 7. The first acceleration sensor device 40A and the second acceleration sensor device 40B are electrically connected to the second digital interface 84 of the microcontroller 80 via the second digital interface bus BS2. The external synchronization signal EXSYC as the synchronization signal SYC is also input to the first acceleration sensor device 40A and the second acceleration sensor device 40B.

According to the configuration in which a plurality of acceleration sensor devices are provided as in FIG. 8, an average value or the like which is a statistical value of acceleration data from the plurality of acceleration sensor devices is calculated in the microcontroller 80, and thus high accuracy of acceleration data can be realized. For example, the microcontroller 80 obtains an average value of X-axis acceleration data from the first acceleration sensor device 40A and X-axis acceleration data from the second acceleration sensor device 40B, and outputs the obtained average value to a host device 210 or the like as final X-axis acceleration data. The microcontroller 80 obtains an average value of Y-axis acceleration data from the first acceleration sensor device 40A and Y-axis acceleration data from the second acceleration sensor device 40B, and outputs the obtained average value as final Y-axis acceleration data. The microcontroller 80 obtains an average value of Z-axis acceleration data from the first acceleration sensor device 40A and Z-axis acceleration data from the second acceleration sensor device 40B, and outputs the obtained average value as final Z-axis acceleration data.

In the present embodiment, in a case where a plurality of acceleration sensor devices are provided as mentioned above, the common synchronization signal SYC is input to the plurality of acceleration sensor devices. For example, in the method of the first comparative example, fetch timings for a plurality of pieces of acceleration data used to calculate an average value of the acceleration data are different from each other, and thus there is a problem in that an appropriate average value cannot be obtained. As regards this fact, according to the present embodiment, in a case where acceleration data in an identical coordinate axis is measured by using a plurality of acceleration sensor devices, and an average value thereof is obtained, an average value can be obtained by using a plurality of pieces of acceleration data fetched at an identical synchronization timing based on the synchronization signal SYC, and thus an appropriate average value can be obtained.

In the present embodiment, a plurality of angular velocity sensor devices may be provided as each of X-axis, Y-axis, and Z-axis angular velocity sensor devices. Specifically, the sensor module 10 may include at least one of a second X-axis angular velocity sensor device, a second Y-axis angular velocity sensor device, and a second Z-axis angular velocity sensor device. In this case, at least one sensor device is electrically connected to the first digital interface 83 of the microcontroller 80 via the first digital interface bus BS1. The external synchronization signal EXSYC as the synchronization signal SYC is also input to at least one sensor device.

For example, it is assumed that the second Z-axis angular velocity sensor device is provided as at least one sensor device. In this case, the microcontroller 80 obtains an average value of Z-axis angular velocity data from the Z-axis angular velocity sensor device 30Z and Z-axis angular velocity data from the second Z-axis angular velocity sensor device, and outputs the obtained average value to the host device 210 as final Z-axis angular velocity data. Consequently, it is possible to achieve high accuracy of Z-axis angular velocity data. For X-axis angular velocity data and Y-axis angular velocity data, a plurality of corresponding angular velocity devices are provided, an average value is obtained, and thus it is possible to achieve high accuracy of angular velocity data. In a case where angular velocity data for an identical coordinate axis is measured by using the plurality of angular velocity sensor devices, and an average value thereof is obtained, an average value can be obtained by using a plurality of pieces of angular velocity data fetched at an identical synchronization timing based on the synchronization signal SYC, and thus an appropriate average value can be obtained.

In a vehicle such as an automobile, it is important to measure yawing rotational motion corresponding to rotational motion about the Z axis. Therefore, it is necessary to achieve high accuracy of a Z-axis angular velocity required to measure a yaw angular velocity or a yaw angle, and, in this sense, preferably, the second Z-axis angular velocity sensor device is provided, and an average value of pieces of Z-axis angular velocity data from a plurality of angular velocity sensor devices.

Figure 9:
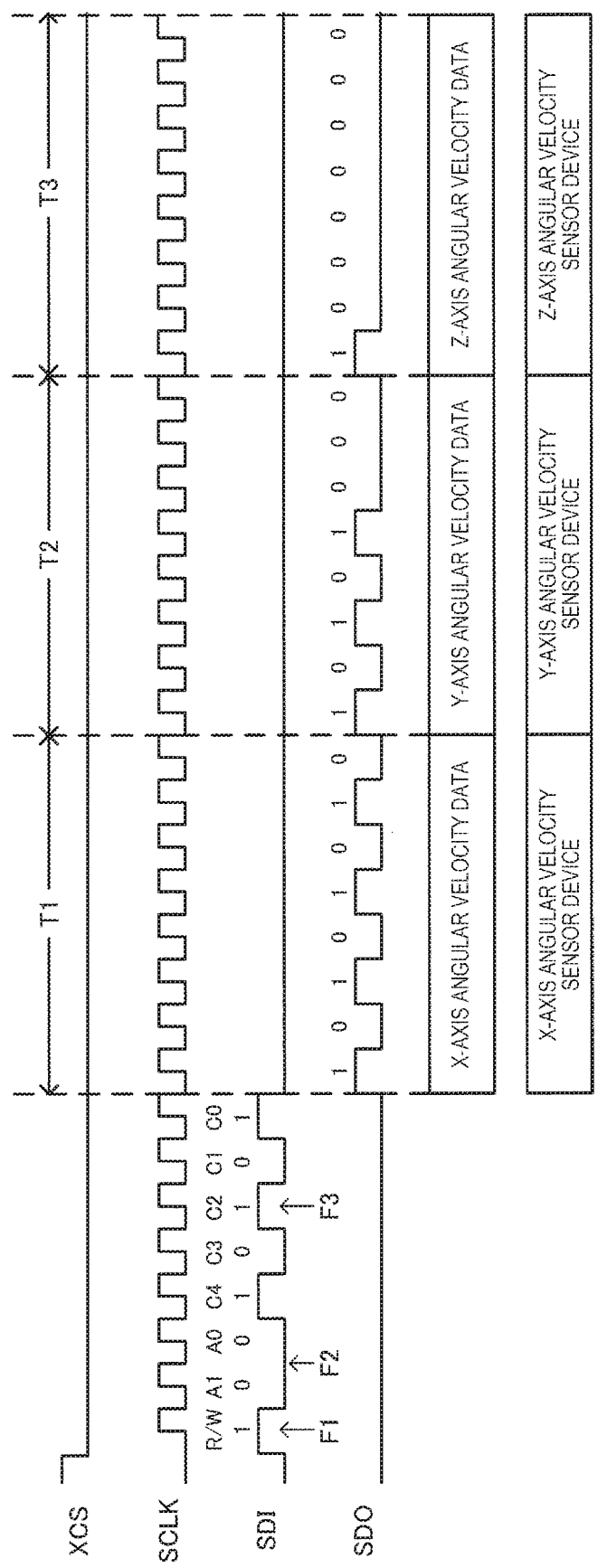
FIG. 9 is a diagram illustrating a signal waveform example in a first digital interface bus.

FIG. 9 is a diagram illustrating a signal waveform example in the first digital interface bus BS1. The first digital interface bus BS1 includes signal lines for a chip select signal XCS, a clock signal SCLK, a data input signal SDI, and a data output signal SDO. First, the chip select signal XCS in a negative logic has an L level. Consequently, all of the X-axis angular velocity sensor device 30X, the Y-axis angular velocity sensor device 30Y, and the Z-axis angular velocity sensor device 30Z which are connected in common to the signal line for the chip select signal XCS are selected as chips. R/W of a first 1 bit of the data input signal SDI is a bit giving an instruction for read/write. In a case where R/W is 1, an instruction for read is given, and in a case where R/W is 0, an instruction for write is given. A[1:0] of 2 bits after R/W designates an address. In a case where a common address is designated, A[1:0]=00 is set. In a case where individual addresses of the X-axis angular velocity sensor device 30X, the Y-axis angular velocity sensor device 30Y, and the Z-axis angular velocity sensor device 30Z are designated, A[1:0]=01, 10, and 11 is set. C[4:0] of 5 bits after A[1:0] designates a command content and a register address.

In FIG. 9, as indicated by F1, R/W is 1, and thus an instruction for read is given, so that the microcontroller 80 issues a read command.

As indicated by F2, A[1:0] is 00, and thus a common address is designated. An instruction for a command content and a register address is given by F3. Consequently, in a period T1, the X-axis angular velocity sensor device 30X outputs X-axis angular velocity data, in the next period T2, the Y-axis angular velocity sensor device 30Y outputs Y-axis angular velocity data, and, in the next period T3, the Z-axis angular velocity sensor device 30Z outputs Z-axis angular velocity data. The X-axis angular velocity data, the Y-axis angular velocity data, the Z-axis angular velocity data are angular velocity data which is fetched from the measurement circuits of the respective angular velocity sensor devices at a common synchronization timing of the synchronization signal SYC. As mentioned above, pieces of angular velocity data from the X-axis angular velocity sensor device 30X, the Y-axis angular velocity sensor device 30Y, and the Z-axis angular velocity sensor device 30Z can be continuously read in the first digital interface bus BS1 in FIG. 9. This is realized by each angular velocity sensor device storing a transmission order thereof, the number of connected angular velocity sensor devices, and the number of bits of transmitted data.

Figure 10:
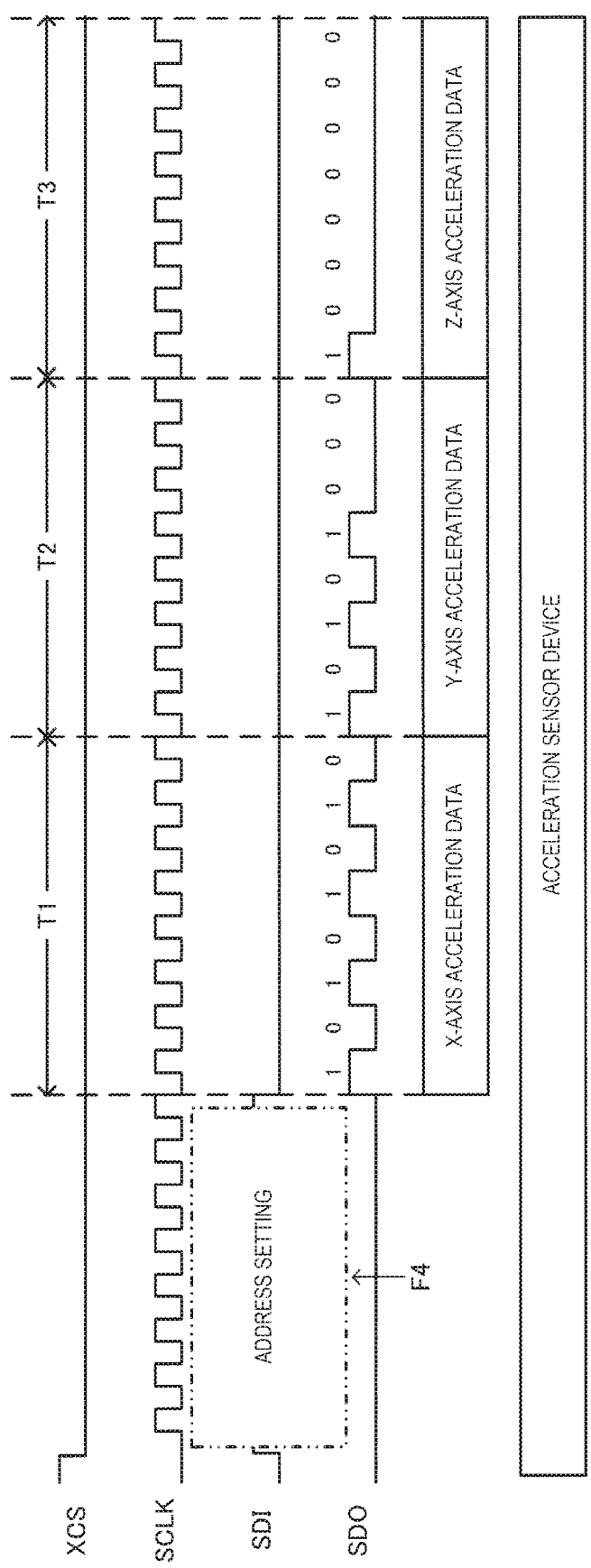
FIG. 10 is a diagram illustrating a signal waveform example in a second digital interface bus.

FIG. 10 is a diagram illustrating a signal waveform example in the second digital interface bus BS2. The second digital interface bus BS2 also includes signal lines for the chip select signal XCS, the clock signal SCLK, the data input signal SDI, and the data output signal SDO. In FIG. 10, the chip select signal XCS has an L level, and the acceleration sensor device 40 is selected as a chip. Thereafter, as indicated by F4, address setting for designating an address of the acceleration sensor device 40 is performed by the microcontroller 80 by using the data input signal SDI. The acceleration sensor device 40 outputs X-axis acceleration data in the period T1, outputs Y-axis acceleration data in the next period T2, and outputs Z-axis acceleration data in the next period T3. The X-axis acceleration data, the Y-axis acceleration data, and the Z-axis acceleration data are angular velocity data which is fetched from the measurement circuits of the respective acceleration sensor devices 40 at a common synchronization timing of the synchronization signal SYC. As mentioned above, in the second digital interface bus BS2, the single acceleration sensor device 40 designated through the address setting indicated by F4 sequentially outputs the X-axis acceleration data, the Y-axis acceleration data, and the Z-axis acceleration data.

Figure 11:
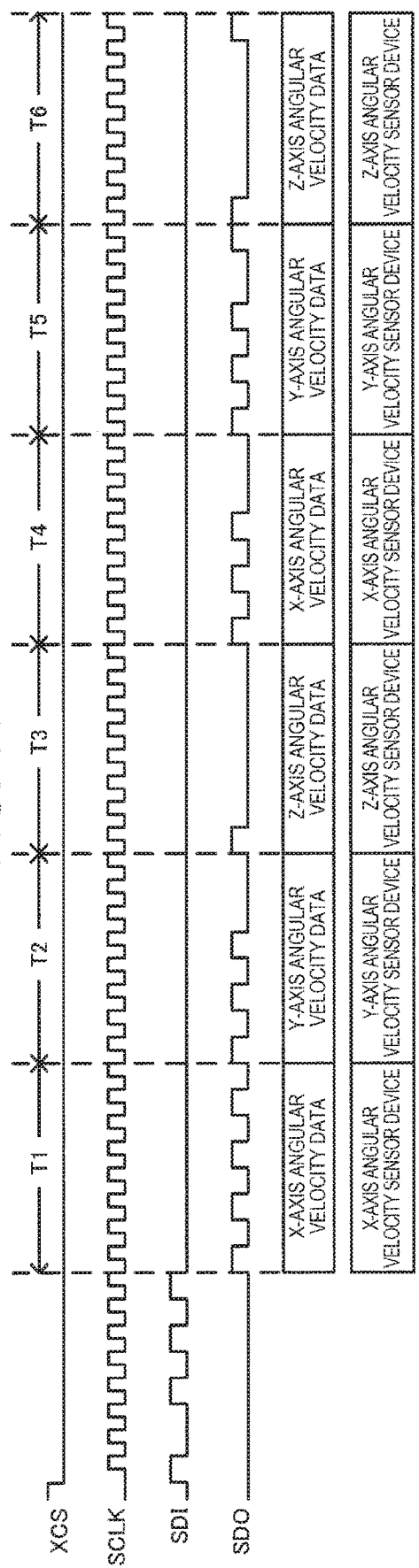
FIG. 11 is a diagram illustrating a signal waveform example in the first digital interface bus.

FIG. 11 illustrates a signal waveform example for explaining the continuation of continuous reading in the first digital interface bus BS1. In FIG. 11, in the period T3, the Z-axis angular velocity sensor device 30Z outputs the Z-axis angular velocity data, and, in the next period T4, the X-axis angular velocity sensor device 30X outputs X-axis angular velocity data. In the next period T5, the Y-axis angular velocity sensor device 30Y outputs Y-axis angular velocity data, and, in the next period T6, the Z-axis angular velocity sensor device 30Z outputs Z-axis angular velocity data.

Figure 12:
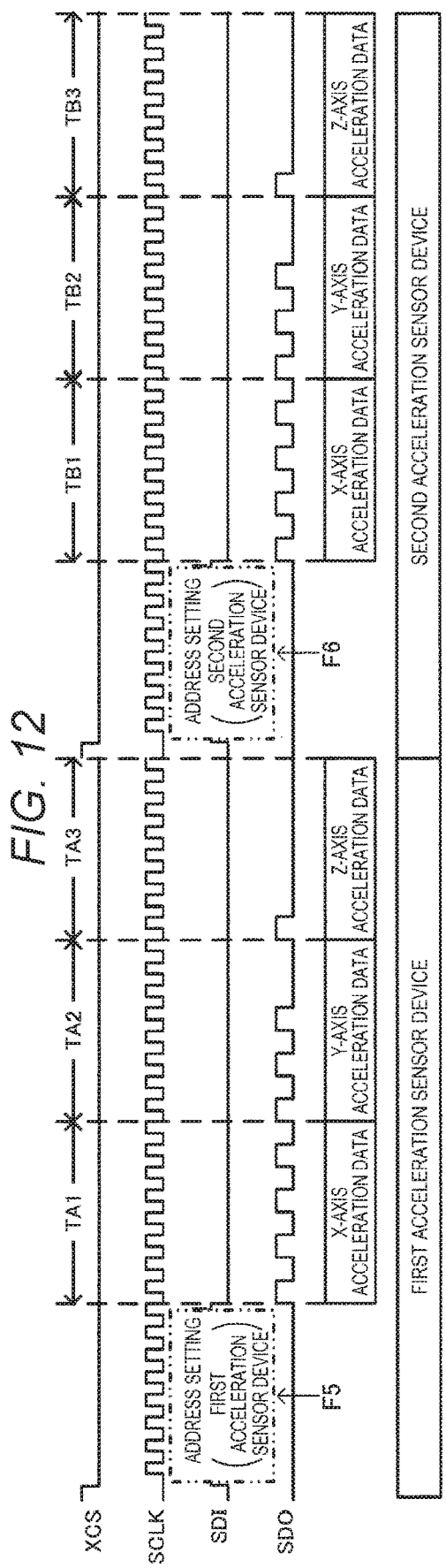
FIG. 12 is a diagram illustrating a signal waveform example in the second digital interface bus.

FIG. 12 is a diagram illustrating a signal waveform example in the second digital interface bus BS2 in a case where the first acceleration sensor device 40A and the second acceleration sensor device 40B are connected as illustrated in FIG. 8. In the second digital interface bus BS2, continuous reading as in the first digital interface bus BS1 cannot be performed. Thus, the microcontroller 80 designates an address of the first acceleration sensor device 40A in address setting in F5. Consequently, the first acceleration sensor device 40A outputs X-axis acceleration data in a period TA1, outputs Y-axis acceleration data in the next period TA2, and outputs Z-axis acceleration data in the next period TA3. Next, the microcontroller 80 designates an address of the second acceleration sensor device 40B in address setting in F6. Consequently, the second acceleration sensor device 40B outputs X-axis acceleration data in a period TB1, outputs Y-axis acceleration data in the next period TB2, and outputs Z-axis acceleration data in the next period TB3.

In this case, in the present embodiment, the X-axis acceleration data output from the first acceleration sensor device 40A in the period TA1 and the X-axis acceleration data output from the second acceleration sensor device 40B in the period TB1 are angular velocity data which is fetched from the measurement circuits of the respective acceleration sensor devices at a common synchronization timing. The Y-axis acceleration data in the period TA2 and the Y-axis acceleration data in the period TB2 are also pieces of acceleration data fetched at a common synchronization timing, and the Z-axis acceleration data in the period TA3 and the Z-axis acceleration data in the period TB3 are also pieces of acceleration data fetched at a common synchronization timing. Fetch of acceleration data at the common synchronization timing is realized by inputting the common synchronization signal SYC to the first acceleration sensor device 40A and the second acceleration sensor device 40B as illustrated in FIG. 8. In the above-described way, in a case where an average value of X-axis acceleration data in the period TA1 and X-axis acceleration data in the period TB1 is obtained, it is possible to improve the accuracy of the average value. Similarly, in a case where an average value of Y-axis acceleration data in the period TA2 and Y-axis acceleration data in the period TB2, or an average value of Z-axis acceleration data in the period TA3 and Z-axis acceleration data in the period TB3 is obtained, it is possible to improve the accuracy of the average value.

In the present embodiment, for example, command systems are different from each other between the first digital interface bus BS1 and the second digital interface bus BS2, and thus communication methods for measurement data are also different from each other. For example, an angular velocity sensor device and an acceleration sensor device have different operation setting parameters or correction process parameters, and thus the types of commands or command parameters are different from each other. Thus, command systems are different from each other between the first digital interface bus BS1 and the second digital interface bus BS2.

As illustrated in FIG. 9, in the angular velocity sensor devices, the angular velocity sensor device for each axis outputs angular velocity data about each axis. In other words, the X-axis angular velocity sensor device 30X outputs X-axis angular velocity data, the Y-axis angular velocity sensor device 30Y outputs Y-axis angular velocity data, and the Z-axis angular velocity sensor device 30Z outputs Z-axis angular velocity data. In contrast, in the acceleration sensor device, a single acceleration sensor device outputs acceleration data about a plurality of axes. In other words, the single acceleration sensor device 40 outputs X-axis acceleration data, Y-axis acceleration data, and Z-axis acceleration data. As mentioned above, communication methods are different from each other between the first digital interface bus BS1 and the second digital interface bus BS2. In the angular velocity sensor devices, angular velocity data from a plurality of angular velocity sensor device can be continuously read. In contrast, acceleration data from a plurality of acceleration sensor devices cannot be continuously read. In other words, as illustrated in FIG. 12, first, an address of the first acceleration sensor device 40A is designated, X-axis, Y-axis, and Z-axis acceleration data are read, and, then, an address of the second acceleration sensor device 40B is designated, and X-axis, Y-axis, and Z-axis acceleration data are read. Regarding this content, communication methods are different from each other between the first digital interface bus BS1 and the second digital interface bus BS2 are different from each other. Even in the acceleration sensor device, there may be a modification in which pieces of data from a plurality of acceleration sensor devices can be continuously read.

2. Measurement System

Figure 13:
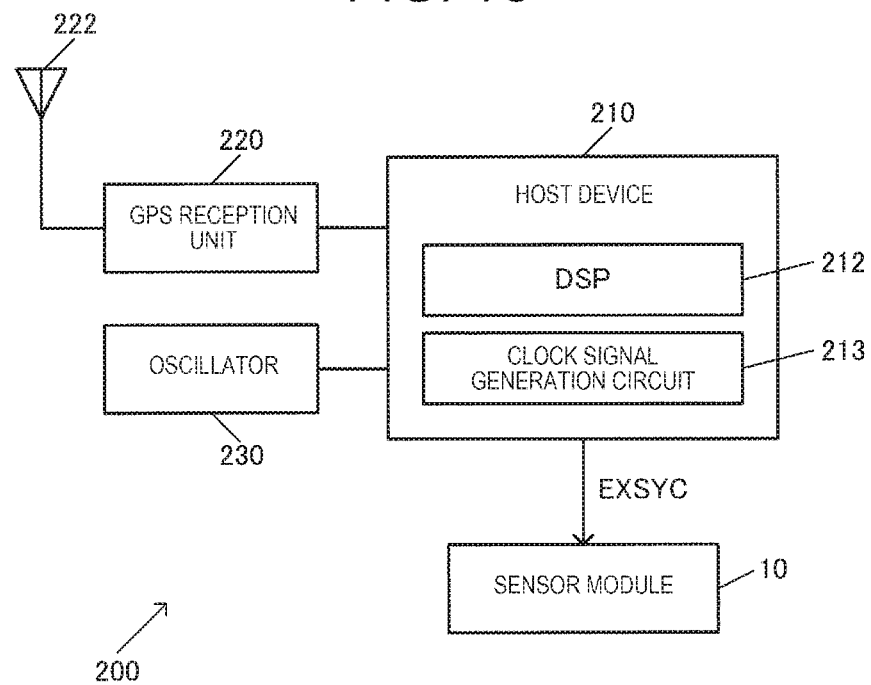
FIG. 13 is a diagram illustrating a configuration example of a measurement system including the sensor module.

FIG. 13 illustrates a configuration example of a measurement system 200 of the present embodiment. The measurement system 200 includes the sensor module 10 and the host device 210 electrically connected to the sensor module 10. The measurement system 200 may include a GPS reception unit 220, a GPS reception antenna 222 and an oscillator 230. In FIG. 13, the sensor module 10 is used as a six-axis inertial measurement unit (IMU). The host device 210 may be implemented by various processors such as an MPU. The host device 210 may be implemented by an integrated circuit device such as an ASIC. The host device 210 includes a digital signal processor (DSP) 212 which performs a digital signal process, and a clock signal generation circuit 213 which generates a clock signal.

The GPS reception unit 220 receives a signal from a GPS satellite via the antenna 222. In other words, a satellite signal on which position information is superimposed is received as a GPS carrier wave. The GPS reception unit 220 is a GPS receiver, and may be implemented by an integrated circuit device including a GPS reception circuit. The host device 210 measures GPS positioning data indicating a position, a velocity, and an azimuth of a measurement target object such as a vehicle on the basis of the signal received by the GPS reception unit 220. The position of the measurement target object is expressed by latitude, longitude, and altitude. The GPS positioning data includes status data indicating a reception state, a reception time, and the like. The host device 210 receives acceleration data and angular velocity data from the sensor module 10, and performs an inertial navigation calculation process on the data so as to obtain inertial navigation positioning data. The inertial navigation positioning data includes acceleration data and posture data of the measurement target object. The host device 210 calculates a position or the like of the measurement target object on the basis of the obtained inertial navigation positioning data and GPS positioning data. In a case where the measurement target object is a vehicle such as an automobile, the host device 210 calculates a position where the vehicle travels on the ground. A process of calculating a position or a posture of the measurement target object may be realized through Karlman filter processing using the DSP 212.

The oscillator 230 generates an oscillation clock signal by using a resonator such as a quartz crystal resonator. The oscillator 230 is, for example, a temperature compensated crystal oscillator (TCXO). Alternatively, as the oscillator 230, an oven type oscillator (OCXO) provided with a thermostatic tank may be used. The clock signal generation circuit 213 generates various clock signals used in the host device 210 on the basis of the oscillation clock signal from the oscillator 230. In this case, the clock signal generation circuit 213 generates a clock signal on the basis of a time reference signal which is a signal acquired from a satellite positioning system such as a GPS. For example, the external synchronization signal EXSYC is generated as one of clock signals.

The host device 210 may obtain accurate absolute time information on the basis of time information included in the satellite signal received by the GPS reception unit 220. The time information is information such as year, month, day, hour, minute, and second. The GPS reception unit 220 outputs a PPS signal in which a pulse is generated every second as the time reference signal. The clock signal generation circuit 213 is configured with a PLL circuit which operates on the basis of the oscillation clock signal from the oscillator 230, and the PPS signal is input to the PLL circuit as a reference signal for clock synchronization. The PLL circuit generates a clock signal synchronized with the PPS signal which is the time reference signal. The host device 210 outputs the external synchronization signal EXSYC synchronized with the time reference signal to the sensor module 10.

As mentioned above, in the present embodiment, the external synchronization signal EXSYC is generated on the basis of the time reference signal. Consequently, it is possible to acquire measurement data in a sensor device by using the external synchronization signal EXSYC generated on the basis of the time reference signal. In other words, it is possible to acquire measurement data from a measurement circuit of the sensor device at a timing synchronized with an accurate time point by using the external synchronization signal EXSYC generated on the basis of the time reference signal. Therefore, the measurement data acquired at an appropriately timing synchronized with the accurate time point can be output to the microcontroller 80, and thus it is possible to achieve high accuracy of information measured by using the sensor module 10.

For example, the host device 210 can acquire accurate absolute time information by using the satellite signal received by the GPS reception unit 220. Therefore, an absolute time point of each synchronization timing of the external synchronization signal EXSYC can also be specified. The measurement data acquired at the synchronization timing of the external synchronization signal EXSYC is output from the sensor module 10. Since a delay time from an acquisition timing for measurement data in a sensor device to a timing at which the measurement data is input to the host device 210 is a delay time due to digital processing, the host device 210 can specify the number of clocks corresponding to a length of the delay time. Therefore, the host device 210 can specify the time at which measurement data such as acceleration data or angular velocity data which is input from the sensor module 10 is acquired. As described above, the host device 210 calculates a position or the like of the measurement target object on the basis of the GPS positioning data obtained by using the satellite signal and the inertial navigation positioning data obtained by using the measurement data from the sensor module 10. Therefore, an absolute time point of an acquisition timing for measurement data such as acceleration data or angular velocity data can be specified, and thus a position or the like of the measurement target object can be accurately calculated.

In the present embodiment, the time reference signal is a signal acquired from, for example, a satellite positioning system. For example, the time reference signal is a PPS signal acquired from the satellite positioning system.

In the above-described way, a time reference signal is acquired by effectively using the satellite positioning system, and measurement data in a sensor device can be acquired by using the external synchronization signal EXSYC generated on the basis of the acquired time reference signal.

In the above description, a global positioning system (GPS) has been described as the satellite positioning system, but other global navigation satellite systems (GNSS) may be used. For example, one, or two or more satellite positioning systems such as a European geostationary-satellite navigation overlay service (EGNOS), a quasi zenith satellite system (QZSS), a global navigation satellite system (GLONASS), GALILEO, and a Beidou navigation satellite system (BeiDou) may be used. As at least one of the satellite positioning systems, a satellite-based augmentation system (SBAS) such as a wide area augmentation system (WAAS) or a European geostationary-satellite navigation overlay service (EGNOS) may be used.

The time reference signal is not limited to a signal acquired from the satellite positioning system. For example, the time reference signal may be generated by using a highly accurate oscillator such as an atomic oscillator, and the time reference signal may be generated by acquiring an absolute time point by using a network.

3. Specific Examples of Sensor Module

Figure 14:
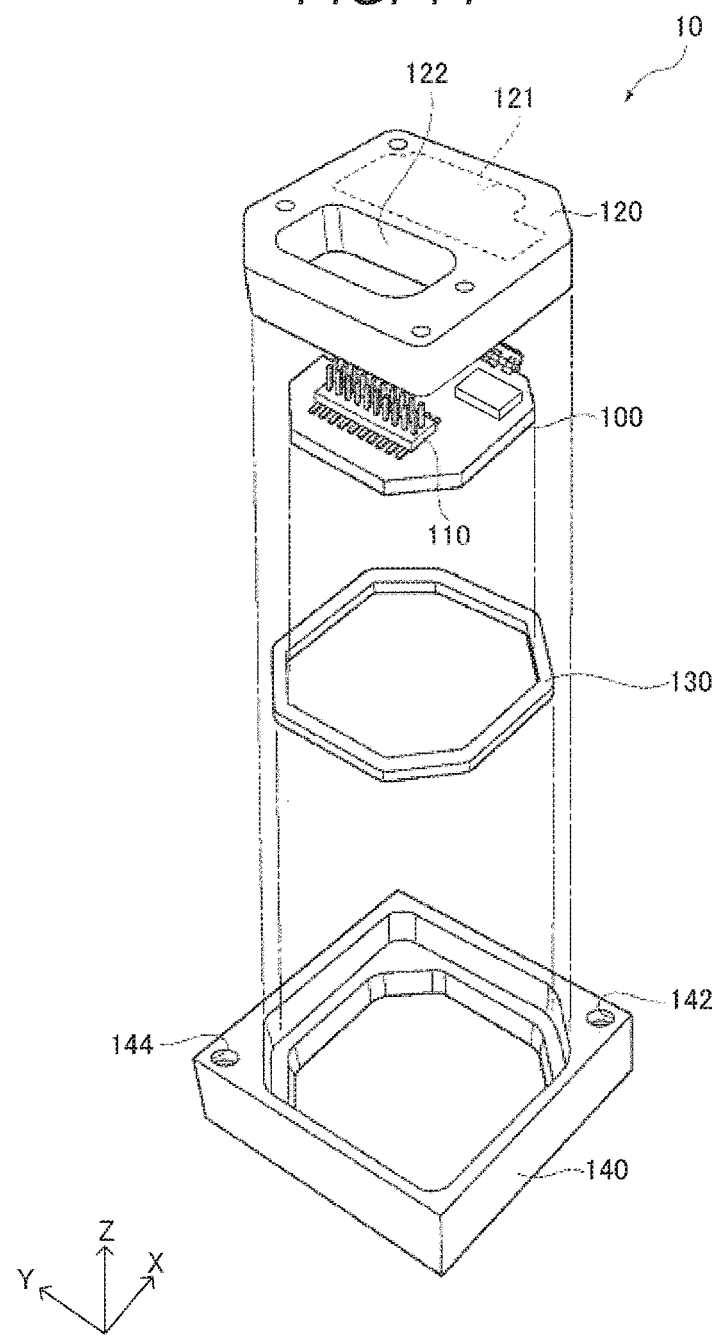
FIG. 14 is an exploded perspective view of the sensor module.

FIG. 14 is an exploded perspective view illustrating a specific example of the sensor module 10. The sensor module 10 in FIG. 14 includes the circuit substrate 100, an inner case 120, an annular buffer material 130, and an outer case 140, so as to configure a sensor unit. The sensor module 10 has a configuration in which the circuit substrate 100 is mounted inside the outer case 140 via the annular buffer material 130. Sensor devices such as angular velocity sensor devices and acceleration sensor devices are mounted on the circuit substrate 100.

The sensor module 10 is a rectangular parallelepiped of which a planar shape is a square shape, and screw holes 142 and 144 are formed near two vertexes located in the diagonal direction of the square.

The sensor module 10 is used in a state of being fixed to an attachment surface of a measurement target object such as an automobile by inserting two screws into the screw holes 142 and 144. An opening 122 is formed on a surface of the sensor module 10 in a top view. The plug type connector 110 is disposed inside the opening 122. The connector 110 has a plurality of arranged pins. A socket type connector is connected to the connector 110, and transmission and reception of electric signals such as the supply of power to the sensor module 10 or output of measurement data measured by the sensor module 10 are performed. The outer case 140 is a pedestal obtained, for example, by cutting out aluminum. An outer shape of the outer case 140 is a rectangular parallelepiped shape of which a planar shape is a square shape in the same manner as the entire shape of the sensor module 10. However, an outer planar shape of the outer case 140 may be, for example, a polygonal shape such as a hexagonal shape or an octagonal shape, a corner of a vertex portion of the polygonal shape may be chamfered, each side thereof may be curved, and an outer shape thereof may be a circular shape.

In FIG. 14, the depression 121 is provided on a bottom surface side of the inner case 120. A sensor device group including an angular velocity sensor device and an acceleration sensor device is disposed in a region overlapping the depression 121 in a plan view (a plan view in the negative direction of the Z axis) viewed from a thickness direction of the circuit substrate 100. A filling member fills a space formed by the circuit substrate 100 and the depression 121, and is solidified. Consequently, a part or the whole of the circuit substrate 100 and the sensor device group is covered with the filling member, and thus a resonance frequency can be shifted to be excluded from a band of noise resonance from the outside.

4. Angular Velocity Sensor Device

Figure 15:
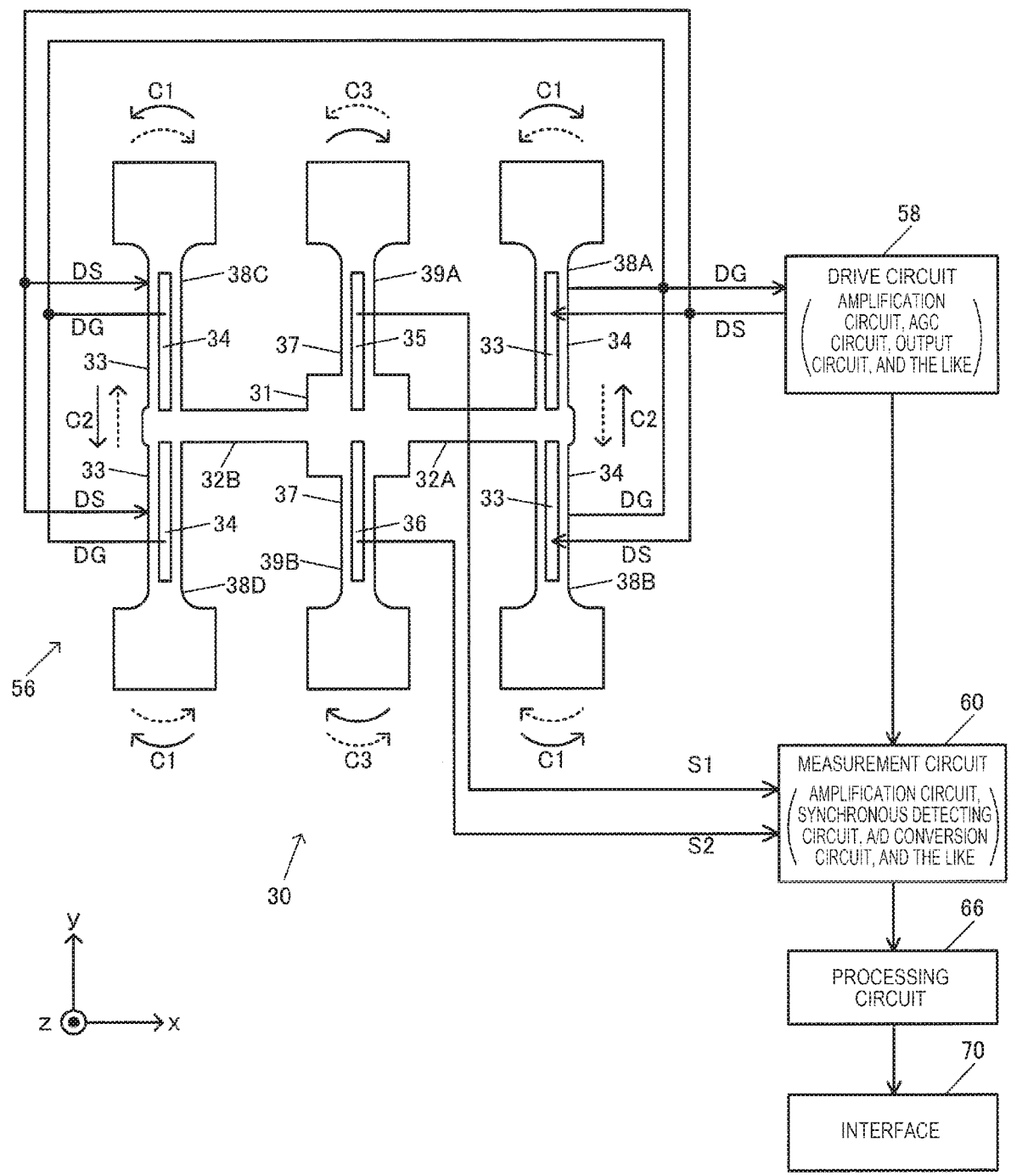
FIG. 15 is a diagram illustrating a configuration example of an angular velocity sensor device.

FIG. 15 illustrates a detailed configuration example of an angular velocity sensor device 30. The angular velocity sensor device 30 includes a vibrator 56, a drive circuit 58, the measurement circuit 60, the processing circuit 66, and the interface 70. The drive circuit 58 may include an amplification circuit which receives a feedback signal DG from the vibrator 56 and amplifies the signal, an AGC circuit which performs automatic gain control, or an output circuit which outputs a drive signal DS to the vibrator 56. For example, the AGC circuit automatically adjusts a gain in a variable manner such that the amplitude of the feedback signal DG from the vibrator 56 is constant. The output circuit outputs, for example, the drive signal DS of a rectangular wave to the vibrator 56. The measurement circuit 60 may include an amplification circuit, a synchronous detecting circuit, an A/D conversion circuit, and the like. The amplification circuit receives measurement signals S1 and S2 from the vibrator 56, and performs charge-voltage conversion or amplification of the measurement signals S1 and S2 which are differential signals. The synchronous detecting circuit performs synchronous detection for extracting a desired wave by using a synchronization signal from the drive circuit 58. The A/D conversion circuit converts an analog measurement signal having undergone synchronous detection into digital measurement data which is then output to the processing circuit 66. The processing circuit 66 performs various processes such as zero point correction, sensitivity adjustment, a filtering process, and temperature correction on the measurement data, and outputs the measurement data having undergone the processes to the interface 70.

In FIG. 15, a double-T type vibrator is used as the vibrator 56. As the vibrator 56, a tuning fork type or H type vibrator may be used. The vibrator 56 includes drive arms 38A, 38B, 38C, and 38D, detection arms 39A and 39B, a base portion 31, and connection arms 32A and 32B. The detection arms 39A and 39B respectively extend in a +y axis direction and a −y axis direction from the rectangular base portion 31. The connection arms 32A and 32B respectively extend in a +x axis direction and a −x axis direction from the base portion 31. The drive arms 38A and 38B respectively extend in the +y axis direction and the −y axis direction from a distal end part of the connection arm 32A, and drive arms 38C and 38D respectively extend in the +y axis direction and the −y axis direction from a distal end part of the connection arm 32B. Frequency adjustment weight parts are provided on distal end sides of the drive arms 38A, 38B, 38C, and 38D and the detection arms 39A and 39B. In a case where a z axis is set in a thickness direction of the vibrator 56, the vibrator 56 measures an angular velocity about the z axis.

Drive electrodes 33 are formed on upper surfaces and lower surfaces of the drive arms 38A and 38B, and drive electrodes 34 are formed on right side surfaces and left side surfaces of the drive arms 38A and 38B. The drive electrodes 34 are formed on upper surfaces and lower surfaces of the drive arms 38C and 38D, and the drive electrodes 33 are formed on right side surfaces and left side surfaces of the drive arms 38C and 38D. The drive signal DS from the drive circuit 58 is supplied to the drive electrodes 33, and the feedback signal DG from the drive electrodes 34 is input to the drive circuit 58. Detection electrodes 35 are formed on an upper surface and a lower surface of the detection arm 39A, and ground electrodes 37 are formed on a right side surface and a left side surface of the detection arm 39A. Detection electrodes 36 are formed on an upper surface and a lower surface of the detection arm 39B, and the ground electrodes 37 are formed on a right side surface and a left side surface of the detection arm 39B. The detection signals S1 and S2 from the detection electrodes 35 and 36 are input to the measurement circuit 60.

Next, a description will be made of an operation of the angular velocity sensor device 30. In a case where the drive circuit 58 applies the drive signal DS to the drive electrodes 33, the drive arms 38A, 38B, 38C, and 38D perform flexural vibration as indicated by arrows C1 in FIG. 15 due to an inverse piezoelectric effect. For example, a vibration attitude indicated by a solid arrow and a vibration attitude indicated by a dotted arrow are repeated at a predetermined frequency. In other words, flexural vibration is performed in which the distal ends of the drive arms 38A and 38C repeatedly come close to and become distant from each other, and the distal ends of the drive arms 38B and 38D repeatedly come close to and become distant from each other. In this case, since the drive arms 38A and 38B and the drive arms 38C and 38D perform linearly symmetric vibration with respect to the x axis passing through the central position of the base portion 31, the base portion 31, the connection arms 32A and 32B, and the detection arms 39A and 39B scarcely vibrate.

In this state, in a case where an angular velocity is applied to the vibrator 56 with the z axis as a rotation axis, the drive arms 38A, 38B, 38C, and 38D vibrate as indicated by arrows C2 due to the Coriolis force. In other words, the Coriolis force in the direction of the arrow C2 which is orthogonal to the direction of the arrow C1 and the direction of the z axis acts on the drive arms 38A, 38B, 38C, and 38D, and thus a vibration component in the direction of the arrow C2 is generated. The vibration in the direction of the arrow C2 is transferred to the base portion 31 via the connection arms 32A and 32B, and thus the detection arms 39A and 39B perform flexural vibration in the direction of the arrow C3. Electric charge signals generated due to a piezoelectric effect caused by the flexural vibration of the detection arms 39A and 39B are input to the measurement circuit 60 as the detection signals S1 and S2, and thus an angular velocity about the z axis is measured.

5. Electronic Apparatus

Figure 16:
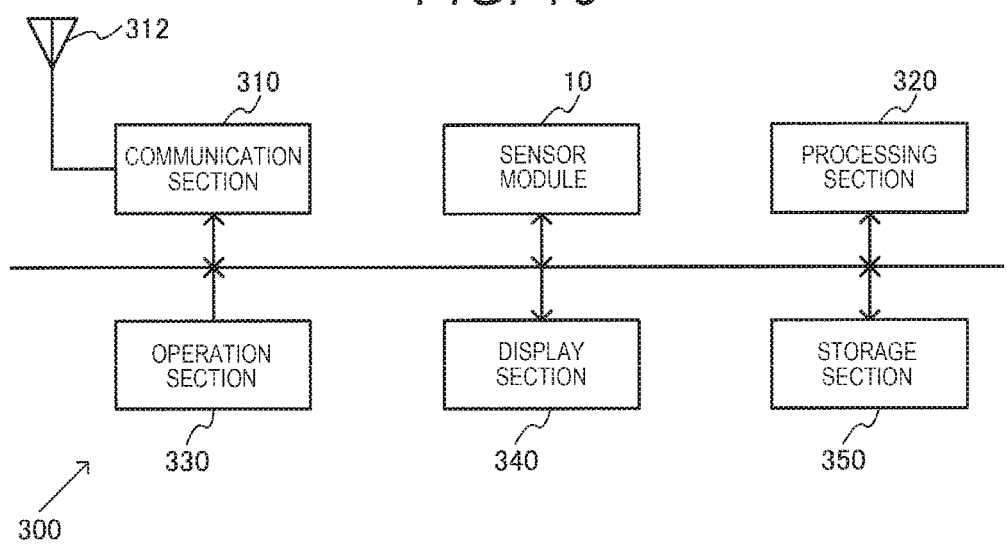
FIG. 16 is a block diagram illustrating a configuration example of an electronic apparatus of the present embodiment.

FIG. 16 is a block diagram illustrating a configuration example of an electronic apparatus 300 of the present embodiment. The electronic apparatus 300 includes the sensor module 10 of the present embodiment, and a processing section 320 which performs a process on the basis of an output signal from the sensor module 10. The electronic apparatus 300 may include a communication section 310, an operation section 330, a display section 340, a storage section 350, and an antenna 312.

The communication section 310 is, for example, a wireless circuit, and performs a process of receiving data from the outside or transmitting data to the outside via the antenna 312. The processing section 320 performs a control process on the electronic apparatus 300, or performs various digital processes on data transmitted and received via the communication section 310. The processing section 320 performs a process on the basis of an output signal from the sensor module 10. Specifically, the processing section 320 performs a signal process such as a correction process or a filtering process on an output signal (output data) such as measurement data in the sensor module 10, or performs various control processes on the electronic apparatus 300 on the basis of the output signal. A function of the processing section 320 may be realized by a processor such as an MPU or a CPU. The operation section 330 is used for a user to perform an input operation, and may be implemented by an operation button or a touch panel display. The display section 340 displays various pieces of information, and may be implemented by a liquid crystal display or an organic EL display. The storage section 350 stores data, and a function thereof may be realized by a semiconductor memory such as a RAM or a ROM.

The electronic apparatus 300 of the present embodiment is applicable to, for example, a video associated apparatus such as a digital camera or a video camera, an on-vehicle apparatus, a wearable apparatus such as a head mounted display or a timepiece associated apparatus, an ink jet ejection apparatus, a robot, a personal computer, a portable information terminal, a printing apparatus, or a projection apparatus. The on-vehicle apparatus is, for example, a car navigation apparatus or an apparatus for automatic driving. The timepiece associated apparatus is a timepiece or a smart timepiece. The inkjet ejection apparatus is, for example, an ink jet printer. The portable information terminal is, for example, a smart phone, a mobile phone, a portable game machine, a notebook PC, or a tablet terminal. The electronic apparatus 300 of the present embodiment is applicable to an electronic organizer, an electronic dictionary, an electronic calculator, a word processor, a workstation, a videophone, a security television monitor, electronic binoculars, a POS terminal, a medical apparatus, a fish-finder, a measurement apparatus, an apparatus for mobile terminal base station, meters and gauges, a flight simulator, and a network server. The medical apparatus is, for example, an electronic thermometer, a sphygmomanometer, a blood glucose monitoring system, an electrocardiographic apparatus, an ultrasonic diagnostic apparatus, or an electronic endoscope. The meters and gauges are, for example, meters and gauges of vehicles, aircrafts, and ships.

Figure 17:
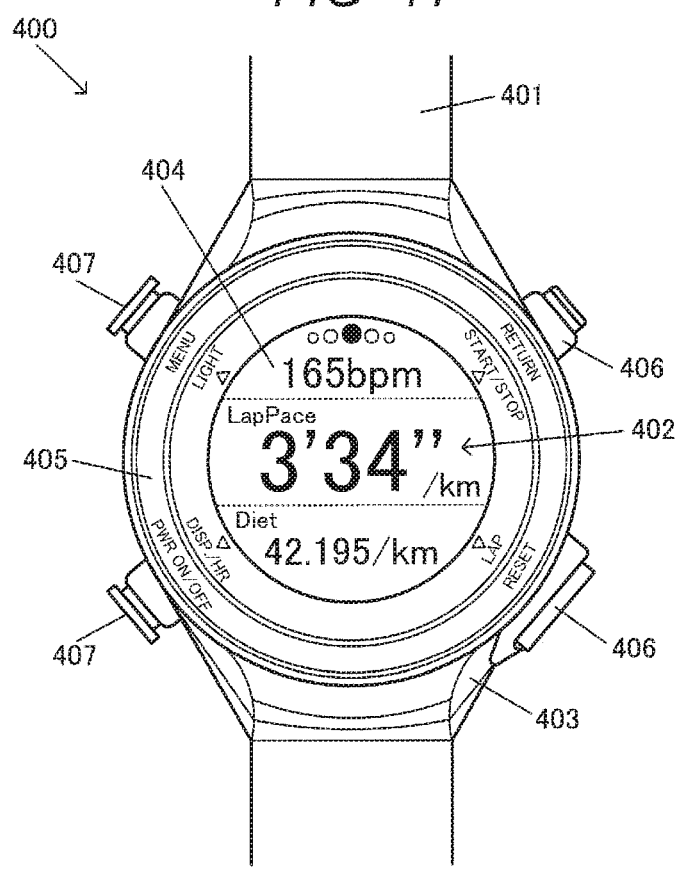
FIG. 17 is a plan view illustrating a wristwatch type activity meter which is a portable electronic apparatus.
Figure 18:
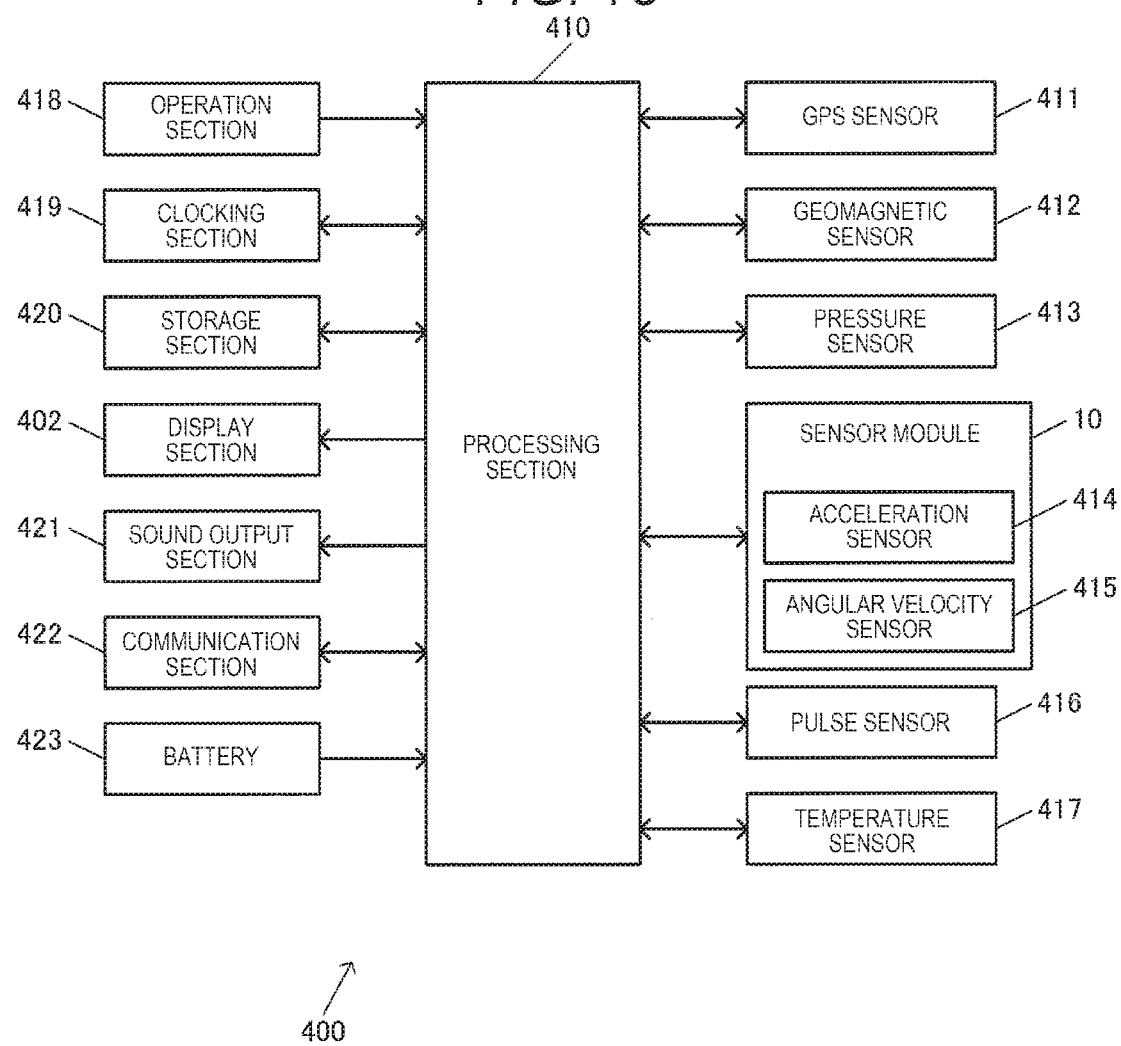
FIG. 18 is a block diagram illustrating a configuration example of the wristwatch type activity meter which is a portable electronic apparatus.

FIG. 17 is a plan view illustrating a wristwatch type activity meter 400 which is a portable electronic apparatus, and FIG. 18 is a block diagram illustrating a configuration example of the activity meter 400. The activity meter 400 is mounted on a part such as a user's wrist via a band 401. The activity meter 400 which is an activity tracker is provided with a display section 402 performing digital display, and can perform wireless communication based on Bluetooth (registered trademark) or Wi-Fi (registered trademark).

As illustrated in FIGS. 17 and 18, the activity meter 400 includes a case 403 in which the sensor module 10 of the present embodiment is accommodated, a processing section 410 which is accommodated in the case 403 and performs a process on the basis of an output signal from the sensor module 10, the display section 402 which is accommodated in the case 403, and a light transmissive cover 404 which closes an opening of the case 403. A bezel 405 is provided outside the light transmissive cover 404, and a plurality of operation buttons 406 and 407 are provided on a side surface of the case 403. The sensor module 10 is provided with an acceleration sensor 414 measuring three-axis accelerations, and an angular velocity sensor 415 measuring three-axis angular velocities as sensor devices. The sensor module 10 may be provided with a geomagnetic sensor 412, a pressure sensor 413, a pulse sensor 416, or a temperature sensor 417 as a sensor device.

The display section 402 displays, for example, position information or a movement amount obtained by using a GPS sensor 411 or the geomagnetic sensor 412, motion information such as a motion amount obtained by using the acceleration sensor 414 or the angular velocity sensor 415, biological information such as a pulse rate obtained by using the pulse sensor 416, or time information such as the current time, according to various measurement modes. An environment temperature obtained by using a temperature sensor 417 may be displayed. A communication section 422 performs communication with an information terminal such as a user terminal. The processing section 410 which is a processor is implemented by an MPU, a DSP, or an ASIC. The processing section 410 performs various processes on the basis of a program stored in a storage section 420, and information which is input from an operation section 418 such as the operation buttons 406 and 407. As processes performed by the processing section 410, there are processes based on output signals from the GPS sensor 411, the geomagnetic sensor 412, the pressure sensor 413, the acceleration sensor 414, the angular velocity sensor 415, the pulse sensor 416, the temperature sensor 417, and a clocking section 419.

The processing section 410 may perform a display process of displaying an image on the display section 402, a sound output process of outputting sounds from a sound output section 421, a communication process of performing communication with an information terminal via the communication section 422, and a power control process of supplying power to each section from a battery 423.

According to the activity meter 400 of the present embodiment having the above-described configuration, it is possible to achieve the effect of the sensor module 10 and thus to realize high reliability. The activity meter 400 includes the GPS sensor 411 and can thus measure a movement distance or a movement path of a user, and thus it is possible to provide the activity meter 400 with high convenience. The activity meter 400 is widely applicable to a running watch, a runner's watch, an outdoor watch, and a GPS watch with a GPS.

6. Vehicle

Figure 19:
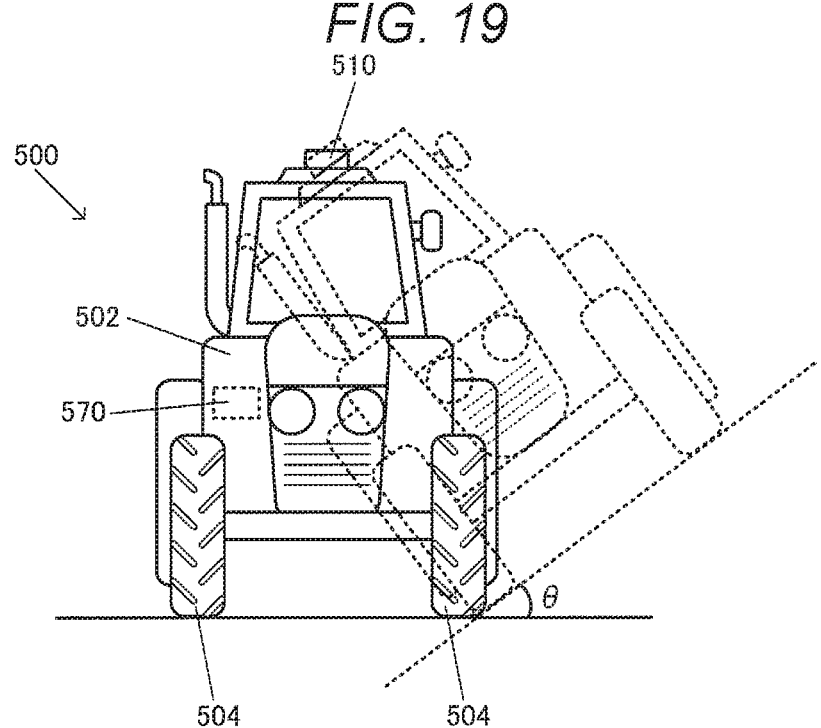
FIG. 19 is a diagram illustrating an example of a vehicle according to the present embodiment.
Figure 20:
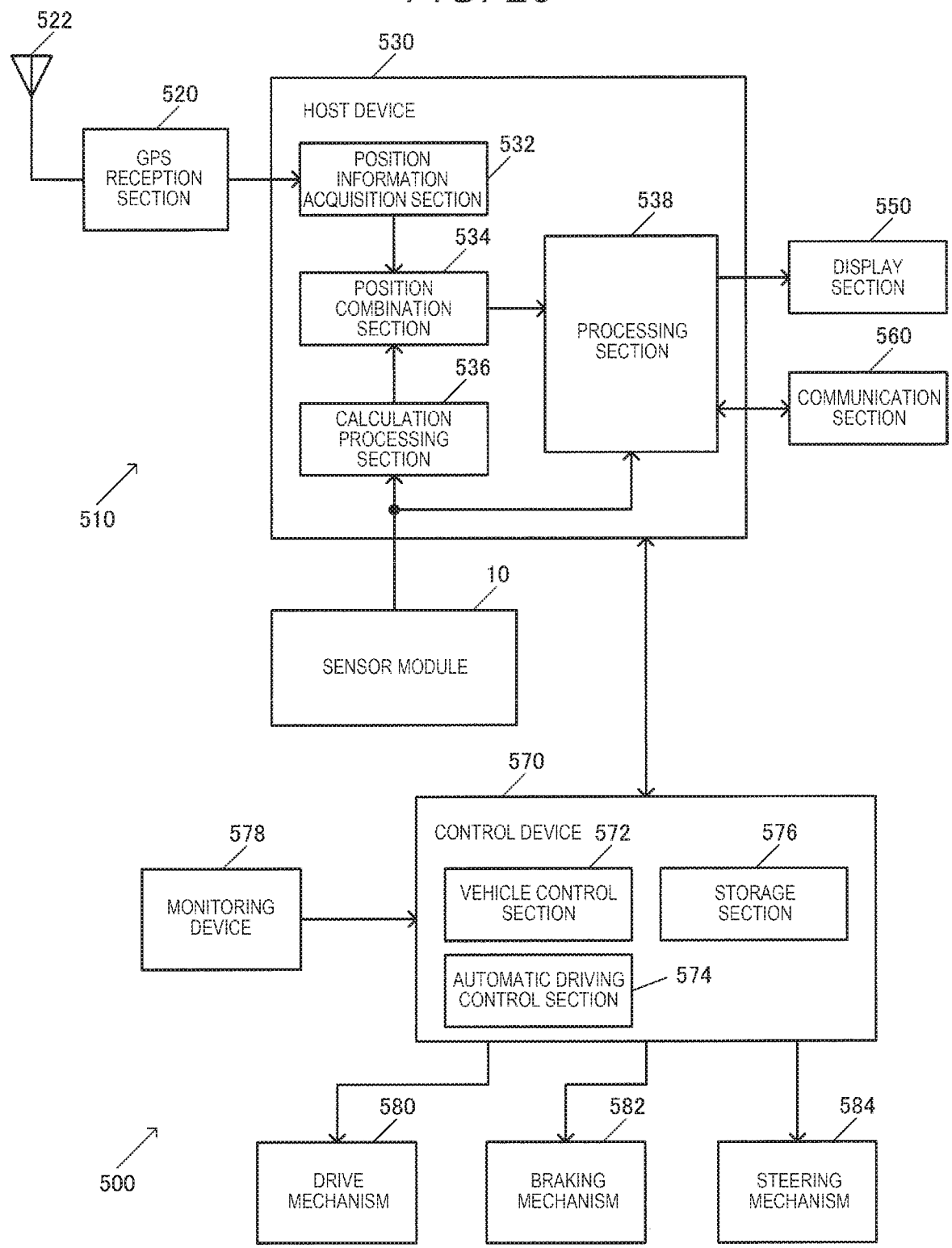
FIG. 20 is a block diagram illustrating a configuration example of the vehicle.

FIG. 19 illustrates a vehicle 500 using the sensor module 10 of the present embodiment. FIG. 20 is a block diagram illustrating a configuration example of the vehicle 500. As illustrated in FIG. 19, the vehicle 500 has a car body 502 and car wheels 504. The vehicle 500 is provided with a positioning apparatus 510, and is provided a control device 570 which performs vehicle control therein. As illustrated in FIG. 20, the vehicle 500 includes a drive mechanism 580 such as an engine or a motor, a braking mechanism 582 such as a disk brake or a drum brake, and a steering mechanism 584 implemented by a steering wheel or a steering gear box. As mentioned above, the vehicle 500 is an apparatus or equipment which includes the drive mechanism 580, the braking mechanism 582, or the steering mechanism 584, and move on the ground, in the air, and in the sea.

As the vehicle 500, there is a vehicle such as a four-wheeled vehicle or a motorcycle, a bicycle, an electric train, an airplane, and a ship, and, in the present embodiment, a four-wheeled vehicle will be described as an example.

The positioning apparatus 510 is attached to the vehicle 500, and performs positioning of the vehicle 500. The positioning apparatus 510 includes the sensor module 10, a GPS reception section 520, a GPS reception antenna 522, and a host device 530. The host device 530 includes a position information acquisition section 532, a position combination section 534, a calculation processing section 536, and a processing section 538. The sensor module 10 which is an IMU includes a three-axis acceleration sensor and a three-axis angular velocity sensor. The calculation processing section 536 receives acceleration data and angular velocity data from the acceleration sensors and the angular velocity sensors, and performs an inertial navigation calculation process on the data so as to output inertial navigation positioning data. The inertial navigation positioning data indicates acceleration and a posture of the vehicle 500.

The GPS reception section 520 receives a signal from a GPS satellite via the antenna 522. The position information acquisition section 532 outputs GPS positioning data indicating a position, velocity, and an azimuth of the vehicle 500 with the positioning apparatus 510 on the basis of the signal received by the GPS reception section 520. The position combination section 534 calculates a position where the vehicle 500 is traveling on the ground on the basis of the inertial navigation positioning data output from the calculation processing section 536 and the GPS positioning data output from the position information acquisition section 532. For example, in a case where positions of the vehicle 500 included in the GPS positioning data are the same as each other, but postures of the vehicle 500 are different from each other due to the influence of an inclination (θ) of the ground, the vehicle 500 travels at different positions on the ground, as illustrated in FIG. 19. Thus, an accurate position of the vehicle 500 cannot be calculated by using only the GPS positioning data. Therefore, the position combination section 534 calculates a position where the vehicle 500 travels on the ground by using data regarding a posture of the vehicle 500 in the inertial navigation positioning data. Position data output from the position combination section 534 is subjected to a predetermined process in the processing section 538, and is displayed on the display section 550 as a positioning result. The position data may be transmitted to an external apparatus via the communication section 560.

The control device 570 controls the drive mechanism 580, the braking mechanism 582, and the steering mechanism 584 of the vehicle 500. The control device 570 is a controller for vehicle control, and may be implemented by, for example, a plurality of control units. The control device 570 includes a vehicle control section 572 which is a control unit performing vehicle control, an automatic driving control section 574 which is a control unit performing automatic driving control, and a storage section 576 implemented by a semiconductor memory. A monitoring device 578 is a device monitoring objects such as a peripheral obstacle of the vehicle 500, and is implemented by a periphery monitoring camera, a millimeter wave radar, or a sonar.

As illustrated in FIG. 20, the vehicle 500 of the present embodiment includes the sensor module 10 and the control device 570. The control device 570 controls a posture of the vehicle 500 on the basis of posture information of the vehicle 500 which is obtained through a process based on an output signal from the sensor module 10. For example, the host device 530 performs the above-described various processes on the basis of output signals including measurement data from the sensor module 10, so as to obtain position information or posture information of the vehicle 500. For example, the position information of the vehicle 500 may be obtained on the basis of the above-described GPS positioning data and inertial navigation positioning data. The posture information of the vehicle 500 may be obtained on the basis of, for example, angular velocity data included in the inertial navigation positioning data. The posture information of the vehicle 500 is information regarding rotational motion corresponding to rolling, pitching, and yawing, and may be indicated by a roll angle, a pitch angle, and a yaw angle.

The control device 570 controls, for example, a posture of the vehicle 500 on the basis of the posture information of the vehicle 500 obtained through the process in the host device 530. This control is performed by, for example, vehicle control section 572. The posture control may be realized, for example, by the control device 570 controlling the steering mechanism 584. Alternatively, in control of stabilizing a posture of the vehicle 500, such as sleep control, the control device 570 may control the drive mechanism 580 or the braking mechanism 582. According to the present embodiment, posture information obtained by using an output signal from the sensor module 10 can be obtained with high accuracy, and thus it is possible to realize appropriate posture control of the vehicle 500.

In the present embodiment, the control device 570 controls at least one of acceleration, braking, and steering of the vehicle 500 on the basis of position information and posture information of the vehicle 500 obtained through processes based on output signals from the sensor module 10. For example, the control device 570 controls at least one of the drive mechanism 580, the braking mechanism 582, and the steering mechanism 584 on the basis of the position information and the posture information of the vehicle 500. Consequently, for example, it is possible to realize automatic driving control of the vehicle 500 by using the automatic driving control section 574. In the automatic driving control, not only the position information and the posture information of the vehicle 500 but also a monitoring result of a peripheral object using the monitoring device 578, or map information or traveling route information stored in the storage section 576. The control device 570 switches between execution and non-execution of automatic driving of the vehicle 500 on the basis of a monitoring result of an output signal from the sensor module 10. For example, the host device 530 monitors an output signal such as measurement data from the sensor module 10. For example, in a case where a reduction in measurement accuracy or sensing abnormality in the sensor module 10 is detected on the basis of the monitoring result, the control device 570 switches execution of automatic driving to non-execution of the automatic driving. For example, in the automatic driving, at least one of acceleration, braking, and steering of the vehicle 500 is automatically controlled. On the other hand, in the non-execution of the automatic driving, automatic control of acceleration, braking, and steering is not performed. In the above-described way, it is possible to perform support with higher reliability on traveling of the vehicle 500 performing automatic driving. Switching between automation levels may be performed on the basis of a monitoring result of an output signal from the sensor module 10.

Although the present embodiment has been described as above in detail, it can be easily understood by a person skilled in the art that various modifications without substantially departing from the new matters and effects of the invention are possible. Therefore, these modifications are all included in the scope of the invention. For example, in the specification or the drawings, the terminologies which are mentioned at least once along with different terminologies which have broader meanings or the same meanings may be replaced with the different terminologies in any location of the specification or the drawings. All combinations of the present embodiment and the modification examples are included in the scope of the invention. In addition, configurations, operations, and the like of the sensor module, the sensor device, the angular velocity sensor device, the acceleration sensor device, the microcontroller, the measurement system, the electronic apparatus, and the vehicle are also not limited to the above description of the present embodiment, and may have various modifications.

What is claimed is:

1. A sensor module comprising:
a first sensor device that includes a first sensor element, a first measurement circuit which receives a signal from the first sensor element and performs a measurement process, and a first interface which outputs first measurement data from the first measurement circuit;
a second sensor device that includes a second sensor element, a second measurement circuit which receives a signal from the second sensor element and performs a measurement process, and a second interface which outputs second measurement data from the second measurement circuit; and
a microcontroller that receives the first measurement data from the first sensor device and the second measurement data from the second sensor device,
wherein the first sensor device further includes a first synchronization terminal to which a synchronization signal corresponding to an external synchronization signal is input,
wherein the first interface outputs the first measurement data to the microcontroller on the basis of the synchronization signal which is input to the first synchronization terminal,
wherein the second sensor device further includes a second synchronization terminal to which the synchronization signal is input, and
wherein the second interface outputs the second measurement data to the microcontroller on the basis of the synchronization signal which is input to the second synchronization terminal.

2. The sensor module according to claim 1,
wherein the first interface outputs the first measurement data which is fetched from the first measurement circuit at a synchronization timing of the synchronization signal, to the microcontroller, and
wherein the second interface outputs the second measurement data which is fetched from the second measurement circuit at the synchronization timing of the synchronization signal, to the microcontroller.

3. The sensor module according to claim 1,
wherein the microcontroller includes a synchronization terminal to which the external synchronization signal is input.

4. The sensor module according to claim 1,
wherein the microcontroller includes an interruption controller, and
wherein the external synchronization signal is input to the interruption controller.

5. The sensor module according to claim 4,
wherein the microcontroller includes a processing circuit, and
wherein the processing circuit performs a process of issuing a command for acquiring the first measurement data from the first sensor device and the second measurement data from the second sensor device, with the external synchronization signal as an interruption cause.

6. The sensor module according to claim 1,
wherein the microcontroller includes a processing circuit, and
wherein the processing circuit performs a process of issuing a command for acquiring the first measurement data from the first sensor device and the second measurement data from the second sensor device, with the external synchronization signal as an interruption cause.

7. The sensor module according to claim 1,
wherein the microcontroller includes a signal processing circuit that performs a digital signal process on the first measurement data from the first sensor device and the second measurement data from the second sensor device, and
wherein the signal processing circuit performs the digital signal process every synchronization timing of the external synchronization signal.

8. The sensor module according to claim 7,
wherein, in a case where the digital signal process is completed, the microcontroller outputs a signal indicating completion of the digital signal process to the outside.

9. The sensor module according to claim 8,
wherein the microcontroller further includes a host interface, and
wherein the microcontroller outputs the first measurement data and the second measurement data having undergone the digital signal process to the outside via the host interface.

10. The sensor module according to claim 7,
wherein the microcontroller further includes a host interface, and
wherein the microcontroller outputs the first measurement data and the second measurement data having undergone the digital signal process to the outside via the host interface.

11. The sensor module according to claim 1,
wherein the external synchronization signal is a signal generated on the basis of a time reference signal.

12. The sensor module according to claim 11,
wherein the time reference signal is a signal acquired from a satellite positioning system.

13. A measurement system comprising:
the sensor module according to claim 1; and
a host device that is electrically connected to the sensor module.

14. A vehicle comprising:
the sensor module according to claim 1; and
a control device that controls a posture of a vehicle on the basis of posture information of the vehicle obtained through a process based on an output signal from the sensor module.

* * * * *